United States Patent
Cheng et al.

(10) Patent No.: US 10,198,438 B2
(45) Date of Patent: *Feb. 5, 2019

(54) E-SERVICES TRANSLATION UTILIZING MACHINE TRANSLATION AND TRANSLATION MEMORY

(71) Applicant: SDL Inc., Wakefield, MA (US)

(72) Inventors: Shang-Che Cheng, Saratoga, CA (US); Alexander Pressman, Saratoga, CA (US); Hong Zhang, Cupertino, CA (US); Pei Chiang Ma, Sunnyvale, CA (US); Shuan Zhang, Foster City, CA (US); Jochen Hummel, Alexandria, VA (US)

(73) Assignee: SDL Inc., Wakefield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,213

(22) Filed: Jun. 20, 2014

(65) Prior Publication Data

US 2015/0142415 A1 May 21, 2015

Related U.S. Application Data

(63) Continuation of application No. 13/052,041, filed on Mar. 18, 2011, which is a continuation of application
(Continued)

(51) Int. Cl.
 *G06F 17/28* (2006.01)
(52) U.S. Cl.
 CPC ........ *G06F 17/289* (2013.01); *G06F 17/2836* (2013.01); *G06F 17/2854* (2013.01); *G06F 17/2827* (2013.01)
(58) Field of Classification Search
 CPC .... G01F 17/289; G01F 17/28; G01F 17/2836; G01F 17/2827
See application file for complete search history.

(56) References Cited

U.S. PATENT DOCUMENTS

| 4,661,924 A | 4/1987 | Okamoto et al. |
| 4,674,044 A | 6/1987 | Kalmus et al. |

(Continued)

FOREIGN PATENT DOCUMENTS

| AU | 5240198A A | 5/1998 |
| AU | 694367B2 B2 | 7/1998 |

(Continued)

OTHER PUBLICATIONS

Papineni, Kishore, et al. "BLEU: a method for automatic evaluation of machine translation." Proceedings of the 40th annual meeting on association for computational linguistics. Association for Computational Linguistics, 2002.*

(Continued)

*Primary Examiner* — Jialong He
(74) *Attorney, Agent, or Firm* — Carr & Ferrell LLP

(57) ABSTRACT

A system and method for translating data from a source language to a target language is provided wherein machine generated target translation of a source sentence is compared to a database of human generated target sentences. If a matching human generated target sentence is found, the human generated target sentence may be used instead of the machine generated sentence, since the human generated target sentence is more likely to be a well-formed sentence than the machine generated sentence. The system and method does not rely on a translation memory containing pairs of sentences in both source and target languages, and minimizes the reliance on a human translator to correct a translation generated by machine translation.

7 Claims, 15 Drawing Sheets

Related U.S. Application Data

No. 11/953,569, filed on Dec. 10, 2007, now Pat. No. 7,925,494, which is a continuation of application No. 11/735,763, filed on Apr. 16, 2007, now abandoned, which is a continuation of application No. 11/515,398, filed on Sep. 5, 2006, now abandoned, which is a continuation of application No. 11/123,071, filed on May 6, 2005, now abandoned, which is a continuation-in-part of application No. 09/662,758, filed on Sep. 15, 2000, now Pat. No. 7,110,938.

(60) Provisional application No. 60/154,434, filed on Sep. 17, 1999.

(56) References Cited

U.S. PATENT DOCUMENTS

| | | |
|---|---|---|
| 4,677,552 A | 6/1987 | Sibley, Jr. |
| 4,789,928 A | 12/1988 | Fujisaki |
| 4,845,658 A | 7/1989 | Gifford |
| 4,903,201 A | 2/1990 | Wagner |
| 4,916,614 A | 4/1990 | Kaji et al. |
| 4,920,499 A | 4/1990 | Skeirik |
| 4,962,452 A | 10/1990 | Nogami et al. |
| 4,992,940 A | 2/1991 | Dworkin |
| 5,005,127 A | 4/1991 | Kugimiya et al. |
| 5,020,021 A | 5/1991 | Kaji et al. |
| 5,075,850 A | 12/1991 | Asahioka et al. |
| 5,093,788 A | 3/1992 | Shiotani et al. |
| 5,111,398 A | 5/1992 | Nunberg et al. |
| 5,140,522 A | 8/1992 | Ito et al. |
| 5,146,405 A | 9/1992 | Church |
| 5,168,446 A | 12/1992 | Wiseman |
| 5,224,040 A | 6/1993 | Tou |
| 5,243,515 A | 9/1993 | Lee |
| 5,243,520 A | 9/1993 | Jacobs et al. |
| 5,283,731 A | 2/1994 | Lalonde et al. |
| 5,295,068 A | 3/1994 | Nishino et al. |
| 5,301,109 A | 4/1994 | Landauer et al. |
| 5,325,298 A | 6/1994 | Gallant |
| 5,349,368 A | 9/1994 | Takeda et al. |
| 5,351,189 A | 9/1994 | Doi |
| 5,408,410 A | 4/1995 | Kaji |
| 5,418,717 A | 5/1995 | Su et al. |
| 5,423,032 A | 6/1995 | Byrd et al. |
| 5,477,451 A | 12/1995 | Brown et al. |
| 5,490,061 A | 2/1996 | Tolin et al. |
| 5,497,319 A | 3/1996 | Chong et al. |
| 5,510,981 A | 4/1996 | Berger et al. |
| 5,541,836 A | 7/1996 | Church et al. |
| 5,548,508 A | 8/1996 | Nagami |
| 5,555,343 A | 9/1996 | Luther |
| 5,587,902 A | 12/1996 | Kugimiya |
| 5,640,575 A | 6/1997 | Maruyama et al. |
| 5,642,522 A | 6/1997 | Zaenen et al. |
| 5,644,775 A | 7/1997 | Thompson et al. |
| 5,687,384 A | 11/1997 | Nagase |
| 5,708,780 A | 1/1998 | Levergood et al. |
| 5,708,825 A | 1/1998 | Sotomayor |
| 5,710,562 A | 1/1998 | Gormish et al. |
| 5,715,314 A | 2/1998 | Payne et al. |
| 5,715,402 A | 2/1998 | Popolo |
| 5,724,424 A | 3/1998 | Gifford |
| 5,724,593 A | 3/1998 | Hargrave, III et al. |
| 5,751,957 A | 5/1998 | Hiroya et al. |
| 5,764,906 A | 6/1998 | Edelstein et al. |
| 5,765,138 A | 6/1998 | Aycock et al. |
| 5,794,219 A | 8/1998 | Brown |
| 5,799,269 A | 8/1998 | Schabes et al. |
| 5,802,502 A | 9/1998 | Gell et al. |
| 5,802,525 A | 9/1998 | Rigoutsos |
| 5,812,776 A | 9/1998 | Gifford |
| 5,818,914 A | 10/1998 | Fujisaki |
| 5,819,265 A | 10/1998 | Ravin et al. |
| 5,826,244 A | 10/1998 | Huberman |
| 5,842,204 A | 11/1998 | Andrews et al. |
| 5,844,798 A | 12/1998 | Uramoto |
| 5,845,143 A | 12/1998 | Yamauchi et al. |
| 5,845,306 A | 12/1998 | Schabes et al. |
| 5,848,386 A | 12/1998 | Motoyama |
| 5,850,442 A | 12/1998 | Muftic |
| 5,850,561 A | 12/1998 | Church et al. |
| 5,864,788 A | 1/1999 | Kutsumi |
| 5,873,056 A | 2/1999 | Liddy |
| 5,884,246 A | 3/1999 | Boucher et al. |
| 5,895,446 A | 4/1999 | Takeda et al. |
| 5,909,492 A | 6/1999 | Payne et al. |
| 5,917,484 A | 6/1999 | Mullaney |
| 5,950,194 A | 9/1999 | Bennett et al. |
| 5,956,711 A | 9/1999 | Sullivan et al. |
| 5,956,740 A | 9/1999 | Nosohara |
| 5,960,382 A | 9/1999 | Steiner |
| 5,966,685 A | 10/1999 | Flanagan et al. |
| 5,974,371 A | 10/1999 | Hirai et al. |
| 5,974,372 A | 10/1999 | Barnes |
| 5,974,413 A | 10/1999 | Beauregard et al. |
| 5,987,401 A | 11/1999 | Trudeau |
| 5,987,403 A | 11/1999 | Sugimura |
| 6,044,344 A | 3/2000 | Kanevsky |
| 6,044,363 A | 3/2000 | Mori et al. |
| 6,047,299 A | 4/2000 | Kaijima |
| 6,049,785 A | 4/2000 | Gifford |
| 6,070,138 A | 5/2000 | Iwata |
| 6,085,162 A | 7/2000 | Cherny |
| 6,092,034 A | 7/2000 | McCarley et al. |
| 6,092,035 A | 7/2000 | Kurachi et al. |
| 6,131,082 A | 10/2000 | Hargrave, III et al. |
| 6,139,201 A | 10/2000 | Carbonell et al. |
| 6,154,720 A | 11/2000 | Onishi et al. |
| 6,161,082 A | 12/2000 | Goldberg et al. |
| 6,163,785 A | 12/2000 | Carbonell et al. |
| 6,195,649 B1 | 2/2001 | Gifford |
| 6,199,051 B1 | 3/2001 | Gifford |
| 6,205,437 B1 | 3/2001 | Gifford |
| 6,212,634 B1 | 4/2001 | Geer et al. |
| 6,260,008 B1 | 7/2001 | Sanfilippo |
| 6,278,969 B1 | 8/2001 | King et al. |
| 6,279,112 B1 | 8/2001 | O'toole, Jr. et al. |
| 6,285,978 B1 | 9/2001 | Bernth et al. |
| 6,301,574 B1 | 10/2001 | Thomas et al. |
| 6,304,846 B1 | 10/2001 | George et al. |
| 6,338,033 B1 | 1/2002 | Bourbonnais et al. |
| 6,341,372 B1 | 1/2002 | Datig |
| 6,345,244 B1 | 2/2002 | Clark |
| 6,345,245 B1 | 2/2002 | Sugiyama et al. |
| 6,347,316 B1 | 2/2002 | Redpath |
| 6,353,824 B1 | 3/2002 | Boguraev et al. |
| 6,356,865 B1 | 3/2002 | Franz et al. |
| 6,385,568 B1 | 5/2002 | Brandon et al. |
| 6,393,389 B1 | 5/2002 | Chanod et al. |
| 6,401,105 B1 | 6/2002 | Carlin et al. |
| 6,415,257 B1 | 7/2002 | Junqua |
| 6,442,524 B1 | 8/2002 | Ecker et al. |
| 6,449,599 B1 | 9/2002 | Payne et al. |
| 6,470,306 B1 | 10/2002 | Pringle et al. |
| 6,473,729 B1 | 10/2002 | Gastaldo et al. |
| 6,477,524 B1 | 11/2002 | Taskiran |
| 6,490,358 B1 | 12/2002 | Geer et al. |
| 6,490,563 B2 | 12/2002 | Hon |
| 6,526,426 B1 | 2/2003 | Lakritz |
| 6,622,121 B1 | 9/2003 | Crepy et al. |
| 6,623,529 B1 | 9/2003 | Lakritz |
| 6,658,627 B1 | 12/2003 | Gallup et al. |
| 6,687,671 B2 | 2/2004 | Gudorf et al. |
| 6,731,625 B1 | 5/2004 | Eastep et al. |
| 6,782,384 B2 | 8/2004 | Sloan et al. |
| 6,865,528 B1 | 3/2005 | Huang |
| 6,920,419 B2 | 7/2005 | Kitamura |
| 6,952,691 B2 | 10/2005 | Drissi et al. |
| 6,976,207 B1 | 12/2005 | Rujan |
| 6,990,439 B2 | 1/2006 | Xun |
| 6,993,473 B2 | 1/2006 | Cartus |
| 7,013,264 B2 | 3/2006 | Dolan |
| 7,020,601 B1 | 3/2006 | Hummel et al. |

(56) References Cited

U.S. PATENT DOCUMENTS

| | | |
|---|---|---|
| 7,031,908 B1 | 4/2006 | Huang |
| 7,050,964 B2 | 5/2006 | Menzes |
| 7,089,493 B2 | 8/2006 | Hatori et al. |
| 7,100,117 B1 | 8/2006 | Chwa et al. |
| 7,110,938 B1 | 9/2006 | Cheng et al. |
| 7,124,092 B2 | 10/2006 | O'toole, Jr. et al. |
| 7,155,440 B1 | 12/2006 | Kronmiller et al. |
| 7,177,792 B2 | 2/2007 | Knight |
| 7,185,276 B2 | 2/2007 | Keswa |
| 7,191,447 B1 | 3/2007 | Ellis et al. |
| 7,194,403 B2 | 3/2007 | Okura et al. |
| 7,207,005 B2 | 4/2007 | Laktritz |
| 7,209,875 B2 | 4/2007 | Quirk et al. |
| 7,249,013 B2 | 7/2007 | Al-Onaizan |
| 7,266,767 B2 | 9/2007 | Parker |
| 7,272,639 B1 | 9/2007 | Levergood et al. |
| 7,295,962 B2 | 11/2007 | Marcu |
| 7,295,963 B2 | 11/2007 | Richardson |
| 7,333,927 B2 | 2/2008 | Lee |
| 7,340,388 B2 | 3/2008 | Soricut |
| 7,343,551 B1 | 3/2008 | Bourdev |
| 7,353,165 B2 | 4/2008 | Zhou et al. |
| 7,369,984 B2 | 5/2008 | Fairweather |
| 7,389,222 B1 | 6/2008 | Langmead |
| 7,389,223 B2 | 6/2008 | Atkin |
| 7,448,040 B2 | 11/2008 | Ellis et al. |
| 7,454,326 B2 | 11/2008 | Marcu |
| 7,509,313 B2 | 3/2009 | Colledge |
| 7,516,062 B2 | 4/2009 | Chen et al. |
| 7,533,013 B2 | 5/2009 | Marcu |
| 7,533,338 B2 | 5/2009 | Duncan et al. |
| 7,580,960 B2 | 8/2009 | Travieso et al. |
| 7,587,307 B2 | 9/2009 | Cancedda et al. |
| 7,594,176 B1 | 9/2009 | English |
| 7,596,606 B2 | 9/2009 | Codignotto |
| 7,620,538 B2 | 11/2009 | Marcu |
| 7,620,549 B2 | 11/2009 | Di Cristo |
| 7,624,005 B2 | 11/2009 | Koehn |
| 7,627,479 B2 | 12/2009 | Travieso et al. |
| 7,640,158 B2 | 12/2009 | Detlef et al. |
| 7,668,782 B1 | 2/2010 | Reistad et al. |
| 7,680,647 B2 | 3/2010 | Moore |
| 7,693,717 B2 | 4/2010 | Kahn et al. |
| 7,698,124 B2 | 4/2010 | Menezes et al. |
| 7,716,037 B2 | 5/2010 | Precoda |
| 7,734,459 B2 | 6/2010 | Menezes |
| 7,739,102 B2 | 6/2010 | Bender |
| 7,739,286 B2 | 6/2010 | Sethy |
| 7,788,087 B2 | 8/2010 | Corston-Oliver |
| 7,813,918 B2 | 10/2010 | Muslea |
| 7,865,358 B2 | 1/2011 | Green |
| 7,925,493 B2 | 4/2011 | Watanabe |
| 7,925,494 B2 | 4/2011 | Cheng et al. |
| 7,945,437 B2 | 5/2011 | Mount et al. |
| 7,983,896 B2 | 7/2011 | Ross et al. |
| 7,983,897 B2 | 7/2011 | Chin |
| 7,983,903 B2 | 7/2011 | Gao |
| 8,050,906 B1 | 11/2011 | Zimmerman et al. |
| 8,078,450 B2 | 12/2011 | Anisimovich et al. |
| 8,135,575 B1 | 3/2012 | Dean |
| 8,195,447 B2 | 6/2012 | Anismovich |
| 8,214,196 B2 | 7/2012 | Yamada |
| 8,239,186 B2 | 8/2012 | Chin |
| 8,239,207 B2 | 8/2012 | Seligman |
| 8,249,855 B2 | 8/2012 | Zhou et al. |
| 8,275,604 B2 | 9/2012 | Jiang et al. |
| 8,286,185 B2 | 10/2012 | Ellis et al. |
| 8,296,127 B2 | 10/2012 | Marcu |
| 8,352,244 B2 | 1/2013 | Gao et al. |
| 8,364,463 B2 | 1/2013 | Miyamoto |
| 8,386,234 B2 | 2/2013 | Uchimoto et al. |
| 8,423,346 B2 | 4/2013 | Seo et al. |
| 8,442,812 B2 | 5/2013 | Ehsani |
| 8,521,506 B2 | 8/2013 | Lancaster et al. |
| 8,527,260 B2 | 9/2013 | Best |
| 8,548,794 B2 | 10/2013 | Koehn |
| 8,554,591 B2 | 10/2013 | Reistad et al. |
| 8,594,992 B2 | 11/2013 | Kuhn et al. |
| 8,600,728 B2 | 12/2013 | Knight |
| 8,606,900 B1 | 12/2013 | Levergood et al. |
| 8,612,203 B2 | 12/2013 | Foster |
| 8,615,388 B2 | 12/2013 | Li |
| 8,620,793 B2 | 12/2013 | Knyphausen et al. |
| 8,635,327 B1 | 1/2014 | Levergood et al. |
| 8,635,539 B2 | 1/2014 | Young |
| 8,666,725 B2 | 3/2014 | Och |
| 8,688,454 B2 | 4/2014 | Zheng |
| 8,725,496 B2 | 5/2014 | Zhao |
| 8,768,686 B2 | 7/2014 | Sarikaya et al. |
| 8,775,154 B2 | 7/2014 | Clinchant |
| 8,818,790 B2 | 8/2014 | He et al. |
| 8,843,359 B2 | 9/2014 | Lauder |
| 8,862,456 B2 | 10/2014 | Krack et al. |
| 8,874,427 B2 | 10/2014 | Ross et al. |
| 8,898,052 B2 | 11/2014 | Waibel |
| 8,903,707 B2 | 12/2014 | Zhao |
| 8,930,176 B2 | 1/2015 | Li |
| 8,935,148 B2 | 1/2015 | Christ |
| 8,935,149 B2 | 1/2015 | Zhang |
| 8,935,150 B2 | 1/2015 | Christ |
| 8,935,706 B2 | 1/2015 | Ellis et al. |
| 8,972,268 B2 | 3/2015 | Waibel |
| 9,026,425 B2 | 5/2015 | Nikoulina |
| 9,053,202 B2 | 6/2015 | Viswanadha |
| 9,081,762 B2 | 7/2015 | Wu |
| 9,128,929 B2 | 9/2015 | Albat |
| 9,141,606 B2 | 9/2015 | Marciano |
| 9,176,952 B2 | 11/2015 | Aikawa |
| 9,183,192 B1 | 11/2015 | Ruby, Jr. |
| 9,183,198 B2 | 11/2015 | Shen et al. |
| 9,201,870 B2 | 12/2015 | Jurach |
| 9,208,144 B1 | 12/2015 | Abdulnasyrov |
| 9,262,403 B2 | 2/2016 | Christ |
| 9,342,506 B2 | 5/2016 | Ross et al. |
| 9,396,184 B2 | 7/2016 | Roy |
| 9,400,786 B2 | 7/2016 | Lancaster et al. |
| 9,465,797 B2 | 10/2016 | Ji |
| 9,471,563 B2 | 10/2016 | Trese |
| 9,519,640 B2 | 12/2016 | Perez |
| 9,552,355 B2 | 1/2017 | Dymetman |
| 9,600,473 B2 | 3/2017 | Leydon |
| 9,613,026 B2 | 4/2017 | Hodson |
| 2002/0002461 A1 | 1/2002 | Tetsumoto |
| 2002/0046018 A1 | 4/2002 | Marcu |
| 2002/0083103 A1 | 6/2002 | Ballance |
| 2002/0093416 A1 | 7/2002 | Goers et al. |
| 2002/0099547 A1 | 7/2002 | Chu et al. |
| 2002/0103632 A1 | 8/2002 | Dutta et al. |
| 2002/0110248 A1 | 8/2002 | Kovales et al. |
| 2002/0111787 A1 | 8/2002 | Knyphausen et al. |
| 2002/0124109 A1 | 9/2002 | Brown |
| 2002/0138250 A1 | 9/2002 | Okura et al. |
| 2002/0165708 A1 | 11/2002 | Kumhyr |
| 2002/0169592 A1 | 11/2002 | Aityan |
| 2002/0198701 A1 | 12/2002 | Moore |
| 2003/0004702 A1 | 1/2003 | Higinbotham |
| 2003/0009320 A1 | 1/2003 | Furuta |
| 2003/0016147 A1 | 1/2003 | Evans |
| 2003/0040900 A1 | 2/2003 | D'Agostini |
| 2003/0069879 A1 | 4/2003 | Sloan et al. |
| 2003/0078766 A1 | 4/2003 | Appelt et al. |
| 2003/0105621 A1 | 6/2003 | Mercier |
| 2003/0120479 A1 | 6/2003 | Parkinson et al. |
| 2003/0158723 A1 | 8/2003 | Masuichi et al. |
| 2003/0182279 A1 | 9/2003 | Willows |
| 2003/0194080 A1 | 10/2003 | Michaelis et al. |
| 2003/0200094 A1 | 10/2003 | Gupta |
| 2003/0229622 A1 | 12/2003 | Middelfart |
| 2003/0233222 A1 | 12/2003 | Soricut et al. |
| 2004/0034520 A1 | 2/2004 | Langkilde-Geary |
| 2004/0044517 A1 | 3/2004 | Palmquist |
| 2004/0122656 A1 | 6/2004 | Abir |
| 2004/0172235 A1 | 9/2004 | Pinkham et al. |
| 2004/0255281 A1 | 12/2004 | Imamura et al. |

(56) References Cited

U.S. PATENT DOCUMENTS

| | | |
|---|---|---|
| 2005/0021323 A1 | 1/2005 | Li |
| 2005/0055212 A1 | 3/2005 | Nagao |
| 2005/0075858 A1 | 4/2005 | Pournasseh et al. |
| 2005/0094475 A1 | 5/2005 | Naoi |
| 2005/0171758 A1 | 8/2005 | Palmquist |
| 2005/0171944 A1 | 8/2005 | Palmquist |
| 2005/0197827 A1 | 9/2005 | Ross et al. |
| 2005/0222837 A1 | 10/2005 | Deane |
| 2005/0222973 A1 | 10/2005 | Kaiser |
| 2005/0273314 A1 | 12/2005 | Chang et al. |
| 2006/0015320 A1 | 1/2006 | Och |
| 2006/0095526 A1 | 5/2006 | Levergood et al. |
| 2006/0095848 A1 | 5/2006 | Naik |
| 2006/0136277 A1 | 6/2006 | Perry |
| 2006/0256139 A1 | 11/2006 | Gikandi |
| 2006/0282255 A1 | 12/2006 | Lu |
| 2006/0287844 A1 | 12/2006 | Rich |
| 2007/0043553 A1 | 2/2007 | Dolan |
| 2007/0112553 A1 | 5/2007 | Jacobson |
| 2007/0118378 A1 | 5/2007 | Skuratovsky |
| 2007/0136470 A1 | 6/2007 | Chikkareddy et al. |
| 2007/0150257 A1 | 6/2007 | Cancedda et al. |
| 2007/0192110 A1 | 8/2007 | Mizutani et al. |
| 2007/0230729 A1 | 10/2007 | Naylor et al. |
| 2007/0233460 A1 | 10/2007 | Lancaster et al. |
| 2007/0233463 A1 | 10/2007 | Sparre |
| 2007/0244702 A1 | 10/2007 | Kahn et al. |
| 2007/0294076 A1 | 12/2007 | Shore et al. |
| 2008/0077395 A1 | 3/2008 | Lancaster et al. |
| 2008/0086298 A1 | 4/2008 | Anismovich |
| 2008/0109374 A1 | 5/2008 | Levergood et al. |
| 2008/0141180 A1 | 6/2008 | Reed et al. |
| 2008/0147378 A1 | 6/2008 | Hall |
| 2008/0154577 A1 | 6/2008 | Kim |
| 2008/0201344 A1 | 8/2008 | Levergood et al. |
| 2008/0243834 A1 | 10/2008 | Rieman et al. |
| 2008/0288240 A1 | 11/2008 | D'Agostini et al. |
| 2008/0294982 A1 | 11/2008 | Leung et al. |
| 2009/0094017 A1 | 4/2009 | Chen et al. |
| 2009/0132230 A1 | 5/2009 | Kanevsky et al. |
| 2009/0187577 A1 | 7/2009 | Reznik et al. |
| 2009/0204385 A1 | 8/2009 | Cheng et al. |
| 2009/0217196 A1 | 8/2009 | Neff et al. |
| 2009/0240539 A1 | 9/2009 | Slawson |
| 2009/0248182 A1 | 10/2009 | Logan et al. |
| 2009/0248482 A1 | 10/2009 | Knyphausen et al. |
| 2009/0313005 A1 | 12/2009 | Jaquinta |
| 2009/0326917 A1 | 12/2009 | Hegenberger |
| 2010/0057439 A1 | 3/2010 | Ideuchi et al. |
| 2010/0057561 A1 | 3/2010 | Gifford |
| 2010/0121630 A1 | 5/2010 | Mende et al. |
| 2010/0179803 A1 | 7/2010 | Sawaf |
| 2010/0223047 A1 | 9/2010 | Christ |
| 2010/0241482 A1 | 9/2010 | Knyphausen et al. |
| 2010/0262621 A1 | 10/2010 | Ross et al. |
| 2011/0066469 A1 | 3/2011 | Kadosh |
| 2011/0097693 A1 | 4/2011 | Crawford |
| 2011/0184719 A1 | 7/2011 | Christ |
| 2012/0022852 A1 | 1/2012 | Tregaskis |
| 2012/0046934 A1 | 2/2012 | Cheng et al. |
| 2012/0095747 A1 | 4/2012 | Ross et al. |
| 2012/0185235 A1 | 7/2012 | Albat |
| 2012/0330990 A1 | 12/2012 | Chen et al. |
| 2013/0173247 A1 | 7/2013 | Hodson |
| 2013/0325442 A1 | 12/2013 | Dahlmeier |
| 2013/0346062 A1 | 12/2013 | Lancaster et al. |
| 2014/0006006 A1 | 1/2014 | Christ |
| 2014/0012565 A1 | 1/2014 | Lancaster et al. |
| 2014/0058718 A1 | 2/2014 | Kunchukuttan |
| 2014/0142917 A1 | 5/2014 | D'Penha |
| 2014/0142918 A1 | 5/2014 | Dotterer |
| 2014/0229257 A1 | 8/2014 | Reistad et al. |
| 2014/0297252 A1 | 10/2014 | Prasad et al. |
| 2014/0358519 A1 | 12/2014 | Mirkin |
| 2014/0358524 A1 | 12/2014 | Papula |
| 2014/0365201 A1 | 12/2014 | Gao |
| 2015/0051896 A1 | 2/2015 | Simard |
| 2015/0169554 A1 | 6/2015 | Ross et al. |
| 2015/0186362 A1 | 7/2015 | Li |
| 2016/0253319 A1 | 9/2016 | Ross et al. |

FOREIGN PATENT DOCUMENTS

| | | |
|---|---|---|
| AU | 5202299A A | 10/1999 |
| AU | 199938259 | 11/1999 |
| AU | 761311 | 9/2003 |
| BE | 1076861 | 6/2005 |
| CA | 2221506A1 A1 | 12/1996 |
| CA | 231184 | 7/2009 |
| CH | 1076861 | 6/2005 |
| CN | 1179289 | 12/2004 |
| CN | 1770144 | 5/2006 |
| CN | 101019113 | 8/2007 |
| CN | 101826072 | 9/2010 |
| CN | 101248415 | 10/2010 |
| CN | 102053958 | 5/2011 |
| CN | 102193914A A | 9/2011 |
| CN | 102662935A A | 9/2012 |
| CN | 102902667A A | 1/2013 |
| DE | 69525374T2 T2 | 8/2002 |
| DE | 69431306T2 T2 | 5/2003 |
| DE | 69925831 | 6/2005 |
| DE | 69633564T2 T2 | 11/2005 |
| DE | 2317447 | 1/2014 |
| EP | 0262938 | 4/1988 |
| EP | 0668558 | 8/1995 |
| EP | 0830774B1 B1 | 2/1998 |
| EP | 0830774A2 A2 | 3/1998 |
| EP | 0887748 | 12/1998 |
| EP | 1076861 | 2/2001 |
| EP | 1128301A2 A2 | 8/2001 |
| EP | 1128302A2 A2 | 8/2001 |
| EP | 1128303A2 A2 | 8/2001 |
| EP | 0803103A1 A1 | 2/2002 |
| EP | 1235177A2 A2 | 8/2002 |
| EP | 0734556B1 B1 | 9/2002 |
| EP | 1266313 | 12/2002 |
| EP | 1489523A2 A2 | 12/2004 |
| EP | 1076861 | 6/2005 |
| EP | 1787221 | 5/2007 |
| EP | 1889149 | 2/2008 |
| EP | 2226733 | 9/2010 |
| EP | 2299369A1 A1 | 3/2011 |
| EP | 2317447 | 5/2011 |
| EP | 2336899 | 6/2011 |
| EP | 2317447 | 1/2014 |
| FR | 1076861 | 6/2005 |
| GB | 2241359A A | 8/1991 |
| GB | 1076861 | 6/2005 |
| GB | 2433403 | 6/2007 |
| GB | 2468278 | 9/2010 |
| GB | 2474839 | 5/2011 |
| GB | 2317447 | 1/2014 |
| IE | 1076861 | 6/2005 |
| JP | H04-152466 | 5/1992 |
| JP | H05-135095 | 6/1993 |
| JP | H05-197746 | 8/1993 |
| JP | H06-035962 | 2/1994 |
| JP | H06-259487 | 9/1994 |
| JP | H07-093331 | 4/1995 |
| JP | H08-055123 | 2/1996 |
| JP | H09-114907 | 5/1997 |
| JP | H10-063747 | 3/1998 |
| JP | H10-097530 | 4/1998 |
| JP | H10509543A A | 9/1998 |
| JP | H11507752A A | 7/1999 |
| JP | 3190881B2 B2 | 7/2001 |
| JP | 3190882B2 B2 | 7/2001 |
| JP | 3260693B2 B2 | 2/2002 |
| JP | 2002513970 | 5/2002 |
| JP | 3367675B2 B2 | 1/2003 |
| JP | 2003150623 | 5/2003 |
| JP | 2003157402A A | 5/2003 |
| JP | 2004318510 | 11/2004 |

(56) References Cited

FOREIGN PATENT DOCUMENTS

| | | |
|---|---|---|
| JP | 2005107597 | 4/2005 |
| JP | 2005197827 | 7/2005 |
| JP | 3762882B2 B2 | 4/2006 |
| JP | 2006216073A A | 8/2006 |
| JP | 2007042127A A | 2/2007 |
| JP | 2007249606 | 9/2007 |
| JP | 2008152670 | 7/2008 |
| JP | 2008152760 | 7/2008 |
| JP | 4485548B2 B2 | 6/2010 |
| JP | 4669430B2 B2 | 4/2011 |
| JP | 4718687 | 4/2011 |
| JP | 466937382 B2 | 4/2011 |
| JP | 2011095841 | 5/2011 |
| JP | 5473533 | 2/2014 |
| MX | 244945 | 4/2007 |
| NL | 2317447 | 1/2014 |
| WO | WO 9406086 | 3/1994 |
| WO | WO9516971A1 A1 | 6/1995 |
| WO | WO9613013A1 A1 | 5/1996 |
| WO | WO9642041A2 A2 | 12/1996 |
| WO | WO9715885A1 A1 | 5/1997 |
| WO | WO 9804061 | 1/1998 |
| WO | WO9819224A2 A2 | 5/1998 |
| WO | WO9952626A1 A1 | 10/1999 |
| WO | WO 9957651 | 11/1999 |
| WO | WO 0057320 | 9/2000 |
| WO | WO 0101289 | 1/2001 |
| WO | WO 0129696 | 4/2001 |
| WO | WO 0229622 | 4/2002 |
| WO | W02002039318A1 A1 | 5/2002 |
| WO | WO 2006016171 | 2/2006 |
| WO | WO 2006121849 | 11/2006 |
| WO | W02007068123A1 A1 | 6/2007 |
| WO | WO 2008055360 | 5/2008 |
| WO | WO 2008083503 | 7/2008 |
| WO | WO 2008147647 | 12/2008 |
| WO | WO2010062540A1 A1 | 6/2010 |
| WO | WO2010062542A1 A1 | 6/2010 |

OTHER PUBLICATIONS

Brief Communication mailed Jun. 17, 2015 in European Patent Application 06759147.9 filed May 8, 2006.
Somers, H. "EBMT Seen as Case-based Reasoning" Mt Summit VIII Workshop on Example-Based Machine Translation, 2001, pp. 56-65, XP055196025.
The Minutes of Oral Proceedings mailed Mar. 2, 2015 in European Patent Application 00902634.5 filed Jan. 26, 2000.
Notification of Reexamination mailed Aug. 18, 2015 in Chinese Patent Application 200910253192.6, filed Dec. 14, 2009.
Decision to Refuse mailed Aug. 24, 2015 in European Patent Application 06759147.9, filed May 8, 2006.
Soricut, R, et al., "Using a Large Monolingual Corpus to Improve Translation Accuracy," Proc. of the Conference of the Association for Machine Translation in the Americas (Amta-2002), Aug. 10, 2002, pp. 155-164, XP002275656.
Fung et al. "An IR Approach for Translating New Words from Nonparallel, Comparable Texts," Proceeding COLING '998 Proceedings of the 17th International Conference on Computational Linguistics, 1998.
First Office Action mailed Dec. 26, 2008 in Chinese Patent Application 200580027102.1, filed Aug. 11, 2005.
Second Office Action mailed Aug. 28, 2009 in Chinese Patent Application 200580027102.1, filed Aug. 11, 2005.
Third Office Action mailed Apr. 28, 2010 in Chinese Patent Application 200580027102.1, filed Aug. 11, 2005.
Summons to attend oral proceeding pursuant to Rule 115(1)(EPC) mailed Mar. 20, 2012 in European Patent Application 05772051.8 filed Aug. 11, 2005.
Notification of Reasons for Rejection mailed Jan. 9, 2007 for Japanese Patent Application 2000-547557, filed Apr. 30, 1999.
Decision of Rejection mailed Jul. 3, 2007 for Japanese Patent Application 2000-547557, filed Apr. 30, 1999.
Extended European Search Report and Written Opinion mailed Jan. 26, 2011 for European Patent Application 10189145.5, filed on Oct. 27, 2010.
Notice of Reasons for Rejection mailed Jun. 26, 2012 for Japanese Patent Application P2009-246729. filed Oct. 27, 2009.
Search Report mailed Jan. 22, 2010 for United Kingdom Application GB0918765.9, filed Oct. 27, 2009.
Notice of Reasons for Rejection mailed Mar. 30, 2010 for Japanese Patent Application 2007-282902. filed Apr. 30, 1999.
Decision of Rejection mailed Mar. 15, 2011 for Japanese Patent Application 2007-282902, filed Apr. 30, 1999.
First Office Action mailed Oct. 18, 2011 for Chinese Patent Application 2009102531926, filed Dec. 14, 2009.
Second Office Action mailed Aug. 14, 2012 for Chinese Patent Application 2009102531926, filed Dec. 14, 2009.
European Search Report mailed Apr. 12, 2010 for European Patent Application 09179150.9, filed Dec. 14, 2009.
First Examination Report mailed Jun. 16, 2011 for European Patent Application 09179150.9, filed Dec. 14, 2009.
Notice of Reasons for Rejection mailed Jul. 31, 2012 for Japanese Patent Application 2010-045531, filed Mar. 2, 2010.
First Examination Report mailed Oct. 26, 2012 for United Kingdom Patent Application GB0903418.2, filed Mar. 2, 2009.
First Office Action mailed Jun. 19, 2009 for Chinese Patent Application 200680015388.6, filed May 8, 2006.
First Examination Report mailed Nov. 26, 2009 for European Patent Application 05772051.8, filed May 8, 2006.
Second Examination Report mailed Feb. 19, 2013 for European Patent Application 06759147.9, filed May 8, 2006.
Langlais, et al. "TransType: a Computer-Aided Translation Typing System", in Conference on Language Resources and Evaluation, 2000.
First Notice of Reasons for Rejection mailed Jun. 18, 2013 for Japanese Patent Application 2009-246729, filed Oct. 27, 2009.
First Notice of Reasons for Rejection mailed Jun. 4, 2013 for Japanese Patent Application 2010-045531, filed Oct. 27, 2009.
Rejection Decision mailed May 14, 2013 for Chinese Patent Application 200910253192.6, filed Dec. 14, 2009.
Matsunaga, et al. "Sentence Matching Algorithm of Revised Documents with Considering Context Information," IEICE Technical Report, 2003, pp. 43-48.
Pennington, Paula K. Improving Quality in Translation Through an Awareness of Process and Self-Editing Skills. Eastern Michigan University, ProQuest, UMI Dissertations Publishing, 1994.
Notice of Allowance mailed Jan. 7, 2014 for Japanese Patent Application 2009-246729, filed Oct. 27, 2009.
Kumano et al., "Japanese-English Translation Selection Using Vector Space Model," Journal of Natural Language Processing; vol. 10; No. 3; (2003); pp. 39-59.
Final Rejection and a Decision to Dismiss the Amendment mailed Jan. 7, 2014 for Japanese Patent Application 2010-045531, filed Mar. 2, 2010.
Office Action mailed Feb. 24, 2014 for Chinese Patent Application No. 201010521841.9, filed Oct. 25, 2010.
Extended European Search Report mailed Oct. 24, 2014 for European Patent Application 10185842.1, filed Oct. 1, 2010.
Summons to attend oral proceeding pursuant to Rule 115(1)(EPC) mailed Oct. 13, 2014 in European Patent Application 00902634.5 filed Jan. 26, 2000.
Summons to attend oral proceeding pursuant to Rule 115(1)(EPC) mailed Feb. 3, 2015 in European Patent Application 06759147.9 filed May 8, 2006.
Decision to Refuse mailed Mar. 2, 2015 in European Patent Application 00902634.5 filed Jan. 26, 2000.
Komatsu, H et al, "Corpus-based predictive text input", "Proceedings of the 2005 International Conference on Active Media Technology", 2005, IEEE, pp. 75-80, ISBN 0-7803-9035-0.
Saiz, Jorge Civera: "Novel statistical approaches to text classification, machine translation and computer-assisted translation" Doctor En Informatica Thesis, May 22, 2008, XP002575820 Universidad

(56) References Cited

OTHER PUBLICATIONS

Polit'ecnica de Valencia, Spain. Retrieved from Internet: http://dspace.upv.es/manakin/handle/10251/2502 [retrieved on Mar. 30, 2010]. p. 111-131.

De Gispert, A., Marino, J.B. and Crego, J.M.: "Phrase-Based Alignment Combining Corpus Cooccurrences and Linguistic Knowledge" Proc. of the Int. Workshop on Spoken Language Translation (IWSLT'04), Oct. 1, 2004, XP002575821 Kyoto, Japan. Retrieved from the Internet: http://mi.eng.cam.ac.uk/~ad465/agispert/docs/papers/TP_gispert.pdf [retrieved on Mar. 30, 2010].

Planas, Emmanuel: "SIMILIS Second-generation translation memory software," Translating and the Computer 27, Nov. 2005 [London: Aslib, 2005].

Web Page—New Auction Art Preview, www.netauction.net/dragonart.html, "Come bid on original illustrations," by Greg & Tim Hildebrandt, Feb. 3, 2001. (last accessed Nov. 16, 2011).

Web Pages—BidNet, www.bidnet.com, "Your link to the State and Local Government Market," including Bid Alert Service, Feb. 7, 2009. (last accessed Nov. 16, 2011).

Web Pages—Christie's, www.christies.com, including "How to Buy," and "How to Sell," Apr. 23, 2009. (last accessed Nov. 16, 2011).

Web Pages—Artrock Auction, www.commerce.com, Auction Gallery, Apr. 7, 2007. (last accessed Nov. 16, 2011).

Trados Translator's Workbench for Windows, 1994-1995, Trados GbmH, Stuttgart, Germany, pp. 9-13 and 27-96.

Notification of Reasons for Refusal for Japanese Application No. 2000-607125 mailed on Nov. 10, 2009 (Abstract Only).

Ross et al., U.S. Appl. No. 11/071,706, filed Mar. 3, 2005, Office Communication dated Dec. 13, 2007.

Ross et al., U.S. Appl. No. 11/071,706, filed Mar. 3, 2005, Office Communication dated Oct. 6, 2008.

Ross et al., U.S. Appl. No. 11/071,706, filed Mar. 3, 2005, Office Communication dated Jun. 9, 2009.

Ross et al., U.S. Appl. No. 11/071,706, filed Mar. 3, 2005, Office Communication dated Feb. 18, 2010.

Colucci, Office Communication for U.S. Appl. No. 11/071,706 dated Sep. 24, 2010.

Och, et al., "Improved Alignment Models for Statistical Machine Translation," in: Proceedings of the Joint Workshop on Empirical Methods in NLP and Very Large Corporations, 1999, p. 20-28, downloaded from http://www.actweb.org/anthology-new/W/W99/W99-0604.pdf.

International Search Report and Written Opinion mailed Sep. 4, 2007 in Patent Cooperation Treaty Application No. PCT/US06/17398.

XP 002112717—Machine translation software for the Internet, Harada K.; et al, vol. 28, Nr:2, Page(s): 66-74. Sanyo Technical Review—San'yo Denki Giho, Hirakata, JP-ISSN 0285-516X, Oct. 1, 1996.

XP 000033460—Method to Make a Translated Text File Have the Same Printer Control Tags as the Original Text File, vol. 32, Nr:2, pp. 375-377, IBM Technical Disclosure Bulletin, International Business Machines Corp. (Thornwood), US-ISSN 0018-8689, Jul. 1, 1989.

XP 002565038—Integrating Machine Translation into Translation Memory Systems, Matthias Heyn, pp. 113-126, TKE. Terminology and Knowledge Engineering. Proceedings International Congress on Terminology and Knowledge Engineering, Aug. 29-30, 1996.

XP 002565039—Linking translation memories with example-based machine translation, Michael Carl; Silvia Hansen, pp. 617-624, Machine Translation Summit. Proceedings, Sep. 1, 1999.

XP 55024828—TransType2—An Innovative Computer-Assisted Translation System, ACL 2004, Jul. 21, 2004, Retrieved from the Internet: http://www.mt-archive.info/ACL-2004-Esteban.pdf [retrieved on Apr. 18, 2012].

Bourigault, Surface Grammatical Analysis for the Extraction of Terminological Noun Phrases, Proc. of Coling-92, Aug. 23, 1992, pp. 977-981, Nantes, France.

Thurmair, Making Term Extraction Tools Usable, The Joint Conference of the 8th International Workshop of the European Association for Machine Translation, May 15, 2003, Dublin, Ireland.

Sanfillipo, Section 5.2 Multiword Recognition and Extraction, Eagles LE3-4244, Preliminary Recommendations on Lexical Semantic Encoding, Jan. 7, 1999.

Hindle et al., Structural Ambiguity and lexical Relations, 1993, Association for Computational Linguistics, vol. 19, No. 1, pp. 103-120.

Ratnaparkhi, A Maximum Entropy Model for Part-of-Speech Tagging, 1996, Proceedings for the conference on empirical methods in natural language processing, vol. 1, pp. 133-142.

Somers, H. "Review Article: Example-based Machine Translation," Machine Translation, Issue 14, pp. 113-157, 1999.

Civera, et al. "Computer-Assisted Translation Tool Based on Finite-State Technology," In: Proc. of EAMT, 2006, pp. 33-40 (2006).

Okura, Seiji et al., "Translation Assistance by Autocomplete," The Association for Natural Language Processing, Publication 13th Annual Meeting Proceedings, Mar. 2007, p. 678-679.

Non-Final Office Action, Aug. 4, 2016, U.S. Appl. No. 13/052,041, filed Mar. 18, 2011.

Non-Final Office Action, Aug. 4, 2016, U.S. Appl. No. 15/150,377, filed May 9, 2016.

Nepveu et al. "Adaptive Language and Translation Models for Interactive Machine Translation" Conference on Empirical Methods in Natural Language Processing, Jul. 25, 2004, 8 pages. Retrieved from: http://www.cs.jhu.edu/~yarowsky/sigdat.html.

Ortiz-Martinez et al. "Online Learning for Interactive Statistical Machine Translation" Human Language Technologies: The 2010 Annual Conference of the North American Chapter of the ACL, Jun. 10, 2010, pp. 546-554. Retrieved from: https://www.researchgate.net/publication/220817231_Online_Learning_for_Interactive_Statistical_Machine_Translation .

Callison-Burch et al. "Proceedings of the Seventh Workshop on Statistical Machine Translation" [W12-3100] Proceedings of the Seventh Workshop on Statistical Machine Translation, Jun. 7, 2012, pp. 10-51. Retrieved from: http://aclanthology.info/volumes/proceedings-of-the-seventh-workshop-onstatistical-machine-translation.

Lopez, Adam. "Putting Human Assessments of Machine Translation Systems in Order" [W12-3101] Proceedings of the Seventh Workshop on Statistical Machine Translation, Jun. 7, 2012, pp. 1-9. Retrieved from: http://aclanthology.info/volumes/proceedings-of-the-seventh-workshop-onstatistical-machine-translation.

Avramidis, Eleftherios. "Quality estimation for Machine Translation output using linguistic analysis and decoding features" [W12-3108] Proceedings of the Seventh Workshop on Statistical Machine Translation, Jun. 7, 2012, pp. 84-90. Retrieved from: http://aclanthology.info/volumes/proceedings-of-the-seventh-workshop-onstatistical-machine-translation.

Buck, Christian. " Black Box Features for the WMT 2012 Quality Estimation Shared Task" [W12-3109] Proceedings of the Seventh Workshop on Statistical Machine Translation, Jun. 7, 2012, pp. 91-95. Retrieved from: Proceedings of the Seventh Workshop on Statistical Machine Translation. Retrieved from: http://aclanthology.info/volumes/proceedings-of-the-seventh-workshop-onstatistical-machine-translation.

Felice et al. "Linguistic Features for Quality Estimation" [W12-3110] Proceedings of the Seventh Workshop on Statistical Machine Translation, Jun. 7, 2012, pp. 96-103. Retrieved at: http://aclanthology.info/volumes/proceedings-of-the-seventh-workshop-onstatistical-machine-translation.

Gonzalez-Rubio et al. "PRHLT Submission to the WMT12 Quality Estimation Task" [W12-3111] Proceedings of the Seventh Workshop on Statistical Machine Translation, Jun. 7, 2012, pp. 104-108. Retrieved from: http://aclanthology.info/volumes/proceedings-of-the-seventh-workshop-onstatistical-machine-translation.

Hardmeier et al. "Tree Kernels for Machine Translation Quality Estimation" [W12-3112] Proceedings of the Seventh Workshop on Statistical Machine Translation, Jun. 7, 2012, pp. 109-113. Retrieved from: http://aclanthology.info/volumes/proceedings-of-the-seventh-workshop-onstatistical-machine-translation.

(56) References Cited

OTHER PUBLICATIONS

Langlois et al. "Loria System for the WMT12 Quality Estimation Shared Task" [W12-3113] Proceedings of the Seventh Workshop on Statistical Machine Translation, Jun. 7, 2012, pp. 114-119. Retrieved from: http://aclanthology.info/volumes/proceedings-of-the-seventh-workshop-onstatistical-machine-translation.
Moreau et al. "Quality Estimation: an experimental study using unsupervised similarity measures" [W12-3114] Proceedings of the Seventh Workshop on Statistical Machine Translation, Jun. 7, 2012, pp. 120-126. Retrieved from: http://aclanthology.info/volumes/proceedings-of-the-seventh-workshop-onstatistical-machine-translation.
Gonzalez et al. "The UPC Submission to the WMT 2012 Shared Task on Quality Estimation" [W12-3115] Proceedings of the Seventh Workshop on Statistical Machine Translation, Jun. 7, 2012, pp. 127-132. Retrieved from: http://aclanthology.info/volumes/proceedings-of-the-seventh-workshop-onstatistical-machine-translation.
Popovic, Maja. "Morpheme- and POS-based IBM1 and language model scores for translation quality estimation" Proceedings of the Seventh Workshop on Statistical Machine Translation, Jun. 7, 2012, pp. 133-137. Retrieved from: http://aclanthology.info/volumes/proceedings-of-the-seventh-workshop-onstatistical-machine-translation.
Rubino et al. "DCU-Symantec Submission for the WMT 2012 Quality Estimation Task" [W12-3117] Proceedings of the Seventh Workshop on Statistical Machine Translation, Jun. 7, 2012, pp. 138-144. Retrieved from: http://aclanthology.info/volumes/proceedings-of-the-seventh-workshop-onstatistical-machine-translation.
Soricut et al. "The SDL Language Weaver Systems in the WMT12 Quality Estimation Shared Task" [W12-3118] Proceedings of the Seventh Workshop on Statistical Machine Translation, Jun. 7, 2012, pp. 145-151. Retrieved from: http://aclanthology.info/volumes/proceedings-of-the-seventh-workshop-onstatistical-machine-translation.
Wu et al. "Regression with Phrase Indicators for Estimating MT Quality" [W12-3119] Proceedings of the Seventh Workshop on Statistical Machine Translation, Jun. 7, 2012, pp. 152-156. Retrieved from: http://aclanthology.info/volumes/proceedings-of-the-seventh-workshop-onstatistical-machine-translation.
Wuebker et al. "Hierarchical Incremental Adaptation for Statistical Machine Translation" Proceedings of the 2015 Conference on Empirical Methods in Natural Language Processing, pp. 1059-1065, Lisbon, Portugal, Sep. 17-21, 2015.
"Best Practices—Knowledge Base," Lilt website [online], Mar. 6, 2017 [retrieved on Oct. 19, 2017], Retrieved from the Internet<https://lilt.com/kb/translators/best-practices>, 2 pages.
"Data Security—Knowledge Base," Lilt website [online], Oct. 14, 2016 [retrieved on Oct. 19, 2017], Retrieved from the Internet<https://lilt.com/kb/security>, 1 pages.
"Data Security and Confidentiality," Lilt website [online], 2017 [retrieved on Oct. 19, 2017], Retrieved from the Internet: <https://lilt.com/security>, 7 pages.
"Memories—Knowledge Base," Lilt website [online], Jun. 7, 2017 [retrieved on Oct. 19, 2017], Retrieved from the Internet<https://lilt.com/kb/project-managers/memory>, 4 pages.
"Memories (API)—Knowledge Base," Lilt website [online], Jun. 2, 2017 [retrieved on Oct. 19, 2017], Retrieved from the Internet<https://lilt.com/kb/api/memories>, 1 pages.
"Quoting—Knowledge Base," Lilt website [online], Jun. 7, 2017 [retrieved on Oct. 19, 2017], Retrieved from the Internet: <https://lilt.com/kb/project-managers/quoting>, 4 pages.
"The Editor—Knowledge Base," Lilt website [online], Aug. 15, 2017 [retrieved on Oct. 19, 2017], Retrieved from the Internet<https://lilt.com/kb/translators/editor>, 5 pages.
"Training Lilt—Knowledge Base," Lilt website [online], Oct. 14, 2016 [retrieved on Oct. 20, 2017], Retrieved from the Internet<https://lilt.com/kb/troubleshooting/training-lilt>, 1 page.
"What is Lilt_—Knowledge Base," Lilt website [online],Dec. 15, 2016 [retrieved on Oct. 19, 2017], Retrieved from the Internet<https://lilt.com/kb/what-is-lilt>, 1 page.

"Getting Started—Knowledge Base," Lilt website [online], Apr. 11, 2017 [retrieved on Oct. 20, 2017], Retrieved from the Internet<https://lilt.com/kb/translators/getting-started>, 2 pages.
"The Lexicon—Knowledge Base," Lilt website [online], Jun. 7, 2017 [retrieved on Oct. 20, 2017], Retrieved from the Internet<https://lilt.com/kb/translators/lexicon>, 4 pages.
"Simple Translation—Knowledge Base," Lilt website [online], Aug. 17, 2017 [retrieved on Oct. 20, 2017], Retrieved from the Internet<https://lilt.com/kb/api/simple-translation>, 3 pages.
"Split and Merge—Knowledge Base," Lilt website [online], Oct. 14, 2016 [retrieved on Oct. 20, 2017], Retrieved from the Internet<https://lilt.com/kb/translators/split-merge>, 4 pages.
"Lilt Api _ Api Reference," Lilt website [online], retrieved on Oct. 20, 2017, Retrieved from the Internet<https://lilt.com/docs/api>, 53 pages.
"Automatic Translation Quality—Knowledge Base", Lilt website [online], Dec. 1, 2016, retrieved on Oct. 20, 2017, Retrieved from the Internet<https://lilt.com/kb/evaluation/evaluate-mt>, 4 pages.
"Projects—Knowledge Base,"Lilt website [online], Jun. 7, 2017, retrieved on Oct. 20, 2017, Retrieved from the Internet: <https://lilt.com/kb/project-managers/projects>, 3 pages.
"Getting Started with lilt,"' Lilt website [online], May 30, 2017, retrieved on Oct. 20, 2017, Retrieved from the Internet: <https://lilt.com/kb/api/lilt-js>, 6 pages.
"Interactive Translation—Knowledge Base," Lilt website [online], Aug. 17, 2017, retrieved on Oct. 20, 2017, Retrieved from the Internet<https://lilt.com/kb/api/interactive-translation>, 2 pages.
Hildebrand et al., "Adaptation of the Translation Model for Statistical Machine Translation based on Information Retrieval," EAMT 2005 Conference Proceedings, May 2005, pp. 133-142. Retrieved from https://www.researchgate.net/publication/228634956_Adaptation_of_the_translation_model_for_statistical_machine_translation_based_on_information_retrieval.
Och et al., "The Alignment Template Approach to Statistical Machine Translation Machine Translation," Computational Linguistics, vol. 30. No. 4, Dec. 1, 2004, pp. 417-442 (39 pages with citations). Retrieved from http://dl.acm.org/citation.cfm?id=1105589.
Sethy et al., "Building Topic Specific Language Models Fromwebdata Using Competitive Models," Interspeech 2005—Eurospeech, 9th European Conference on Speech Communication and Technology, Lisbon, Portugal, Sep. 4-8, 2005, 4 pages. Retrieved from https://www.researchgate.net/publication/221490916_Building_topic_specific_language_models_from_webdata_using_competitive_models.
Dobrinkat, "Domain Adaptation in Statistical Machine Translation Systems via User Feedback," Master's Thesis, University of Helsinki, Nov. 25, 2008, 103 pages. Retrieved from http://users.ics.aalto.fi/mdobrink/online-papers/dobrinkat08mt.pdf.
Business Wire, "Language Weaver Introduces User-Managed Customization Tool," Oct. 25, 2005, 3 pages. Retrieved from http: ProQuest.
Winiwarter, W., "Learning Transfer Rules for Machine Translation from Parallel Corpora," Journal of Digital Information Management, vol. 6 No. 4, Aug. 2008, pp. 285-293. Retrieved from https://www.researchgate.net/publication/220608987_Learning_Transfer_Rules_for_Machine_Translation_from_Parallel_Corpora.
Potet et al., "Preliminary Experiments on Using Users' Post-Editions to Enhance a SMT System," Proceedings of the European Association for Machine Translation (EAMT), May 2011, pp. 161-168. Retrieved from Retrieved at http://www.mt-archive.info/EAMT-2011-Potet.pdf.
Ortiz-Martinez et al., "An Interactive Machine Translation System with Online Learning" Proceedings of the ACL-HLT 2011 System Demonstrations, Jun. 21, 2011, pp. 68-73. Retrieved from http://www.aclweb.org/anthology/P11-4012.
Lopez-Salcedo et al.,"Online Learning of Log-Linear Weights in Interactive Machine Translation," Communications in Computer and Information Science, vol. 328, 2011, pp. 1-10. Retrieved from http://www.casmacat.eu/uploads/Main/iberspeech2.pdf.
Blanchon et al., "A Web Service Enabling Gradable Post-edition of Pre-translations Pro duced by Existing Translation Tools: Practical Use to Provide High quality Translation of an Online Encyclopedia" Jan. 2009, 8 pages. Retrieved from http://www.mt-archive.info/MTS-2009-Blanchon.pdf.

(56) References Cited

OTHER PUBLICATIONS

Levenberg et al."Stream-based Translation Models for Statistical Machine Translation" Human Language Technologies: The 2010 Annual Conference of the North American Chapter of the ACL, Dec. 31, 2010, pp. 394-402.
Lagarda et al. "Statistical Post-Editing of a Rule Based Machine Translation System" Proceedings of NAACL HLT 2009: Short Papers, Jun. 2009, pp. 217-220.
Ehara, "Rule Based Machine Translation Combined with Statistical Post Editor for Japanese to English Patent Translation," MT Summit XI, 2007, pp. 13-18.
Bechara et al. "Statistical Post-Editing for a Statistical MT System" Proceedings of the 13th Machine Translation Summit, 2011, pp. 308-315.
"Summons to attend oral proceeding pursuant to Rule 115(1)(EPC)," European Patent Application 10185842.1, Aug. 2017, 9 pages.
Westfall, Edith R., "Integrating Tools with the Translation Process North American Sales and Support," Jan. 1, 1998, pp. 501-505, XP055392884. Retrieved from the Internet: <URL:https://rd.springercom/content/pdf/10.1007/3-540-49478-2_46.pdf>.
"Summons to attend oral proceeding pursuant to Rule 115(1)(EPC)," European Patent Application 09179150.9, dated Dec. 14, 2017, 17 pages.
"Decision to Refuse," European Patent Application 10185842.1, dated Mar. 22, 2018, 16 pages.

* cited by examiner

E-SERVICES TRANSLATION UTILIZING MACHINE TRANSLATION AND TRANSLATION MEMORY

CROSS-REFERENCE TO RELATED APPLICATIONS

The present application is a continuation and claims the priority benefit of U.S. patent application Ser. No. 13/052,041 filed Mar. 18, 2011, entitled "E-SERVICES TRANSLATION UTILIZING MACHINE TRANSLATION AND TRANSLATION MEMORY", which is a continuation and claims the priority benefit of U.S. patent application Ser. No. 11/953,569 filed Dec. 10, 2007, now U.S. Pat. No. 7,925,494, entitled "E-SERVICES TRANSLATION UTILIZING MACHINE TRANSLATION AND TRANSLATION MEMORY", which is a continuation of U.S. patent application Ser. No. 11/735,763 filed Apr. 16, 2007, which is a continuation of U.S. patent application Ser. No. 11/515,398 filed Sep. 5, 2006, which is a continuation of U.S. patent application Ser. No. 11/123,071, filed May 6, 2005, which is a continuation in part of U.S. patent application Ser. No. 09/662,758, now U.S. Pat. No. 7,110,938, entitled "E-SERVICES TRANSLATION PORTAL SYSTEM," filed Sep. 15, 2000, which claims the benefit of U.S. Provisional Application No. 60/154,434, filed Sep. 17, 1999, all of which are incorporated by reference herein as to their entirety.

BACKGROUND OF THE INVENTION

The present invention is directed to a system and method for at least partially translating data and facilitating the completion of the translation process. More in particular, the present invention is directed to a system and method for translating data which includes a source of data to be translated, a network connected to the source of data, a translation source connected to the network, and a portal system connected to the network for retrieving the data to be translated, and at least partially translating that data.

The system and method translates data by combining translation memory and machine translation, and in particular example based machine translation (EBMT).

Still further, the system and method stores source language sentences and target language sentences in the translation memory regardless of whether the sentences are matched to corresponding sentences in the other language.

Currently, there exist individual translation memory tools for use on a translator's workstation. Such translation aids analyze documents on a word-by-word basis, treating each new document as a totally new project. Such systems suffer from reduced efficiency in that they fail to take into account redundancies found in a document, similarities of one document to a previously translated document, and provide no means to enable team collaboration or involve the customer in the translation process.

There is therefore a need to provide a centralized translation database from which prior translations can be utilized to at least partially translate new documents to be translated. There is further a need to involve the translation customer in an iterative process, with intermediate approvals of translation work being obtained as a translation project progresses.

In an era where businesses are able to take advantage of a worldwide marketplace utilizing a global computer network (Internet) it is important that such businesses are able to easily solicit business in multiple languages. Therefore, many businesses desire to have their Web pages translated into multiple languages, so that they are able to solicit business in many different markets. Therefore, a system, which can upload a Web page and duplicate it in multiple languages, is highly desirable. Further, as much multiple languages is highly desirable. Further, as much of the language of anyone Web page is similar to that of other Web pages, it is further desirable to make use of the translations of previously translated Web pages to aid in the translation of other Web pages. By such an arrangement, the present invention reduces the workload of translators, whether it is translation of Web pages or other documents.

Further, it would be advantageous if a system and method could be devised that did not rely on a translation memory containing pairs of sentences in both source and target languages. It would also be advantageous to have a translation system and method minimized the reliance on a human translator to correct a translation generated by machine translation (MT).

While reducing the workload of translators by making use of translations of previously translated documents and materials is advantageous, it is desirable to further reduce the workload of translators by implementing a system whereby machine generated translation, in a target language, of a source sentence is compared to a database of human generated target sentences. In this manner if a human generated target sentence is found, the human generated target sentence can be used instead of the machine generated sentence, since the human generated target sentence is more likely to be a well-formed sentence than the machine generated sentence.

Example based machine translation (EBMT) is a more language independent approach than machine translation. Example based machine translation works on units of data smaller than the sentences utilized in machine translation. Example based machine translation uses a bilingual corpus to align not only sentences, but also phrases or even words from source language to target language. If a target sentence match a source sentence is not found, a target sentence might be built from phrases that have been already translated in different sentences stored in the translation memory. While a well defined domain example based machine translation can retrieve correct terms and phrases, it has a trouble generating well formed sentences.

SUMMARY OF THE INVENTION

A system for translating data is provided. The translating system includes a source of data to be translated, and a network connected to the source of data. The system further includes a translation source connected to the network and a portal system connected to the network for retrieving the data to be translated. The portal system includes a system for at least partially translating the data and a system for transmitting the at least partially translated data to the translation source for completing the translation of the data.

From another aspect, a system for translating data transmitted electronically through a global computer network is provided. The system includes at least one user terminal coupled to the global computer network for transmitting and receiving user related data therethrough. The system also includes at least one vendor terminal coupled to the global computer network for transmitting and receiving vendor related data therethrough. The system includes a first computer coupled to the global computer network for exchanging user related data with the at least one user terminal and vendor related data with the at least one vendor terminal through the global computer network. A file storage memory is provided which is coupled to the first computer for storing user related current document data representing documents to be transmitted from the at least one user terminal. A second computer is provided that is coupled to the first computer and the file storage memory for at least partially translating the current document data. The system also includes a database of previously entered document data and associated translated document data coupled to the second computer. The second computer compares the current document data with the previously entered document data to match the current document data with corresponding translated document data in the database to form the at least partial translation of the current document data. The at least partial translation is sent to the first computer and transmitted therefrom to the at least one vendor terminal for completing translation of the current document data and uploading the completed translation to the first computer. The first computer includes a system for transmitting the completed translation to the at least one user terminal and the second computer. The second computer includes a system for adding the current document data and the completed translation to the database.

In order to overcome the limitations of example based machine translation, the present system and method can store source and target language sentences in the translation memory regardless of whether the sentences are in matched pairs. In an extreme situation, the translation memory contains only a huge collection of source and target language sentences, where none of the sentences are paired together. Upon receiving source data, the system and method of the present invention will search the translation memory. If no match is found in the translation memory, the machine translation is accessed. The machine translation will then produce a target sentence. This target sentence may have correct terms and phrases, but it is very likely that the target sentence will be poorly constructed. Instead of presenting the target sentence to a human translator for correction, the system and method makes use of the matching capability of the translation memory to find a similar target sentence. This search can be executed over all the available target sentences in the translation memory, even if the sentences are not paired up with corresponding source language sentences. If a good match is found, the system and method will select that sentence instead of the machine generated sentence. The sentence could then be sent to a human translator for a final check.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Figure 1:
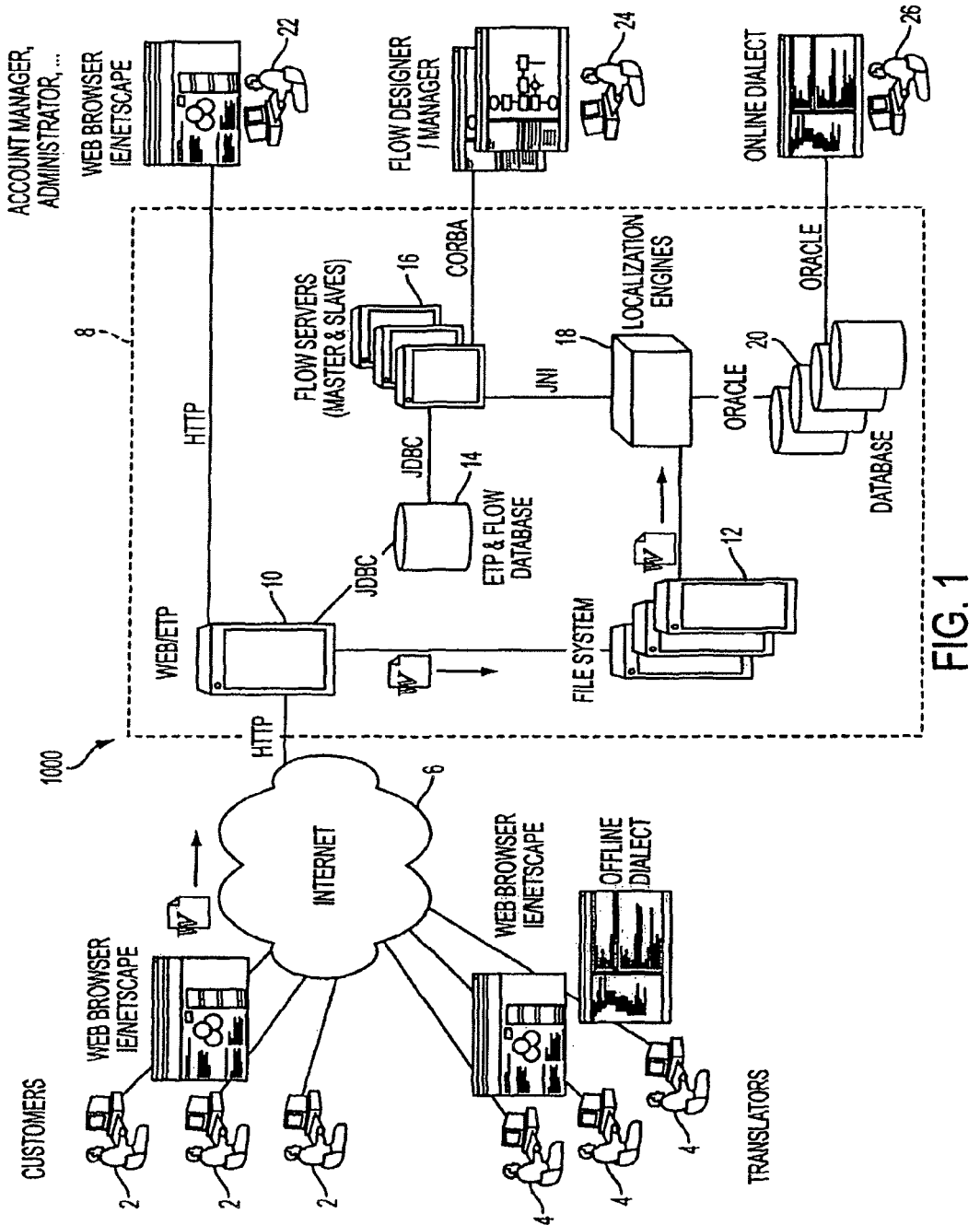
FIG. 1 is an architectural overview diagram of the present invention.

The present invention is directed to a language translation system method that may be implemented as a portal on a global computer/communications network and combines advanced translation technologies with human translators for carrying out cost-efficient multilingual electronic commerce initiatives.

In FIGS. 1-4, system 1000 is illustrated. System 1000 provides a language portal implemented on the Internet. A plurality of customers (or users) 2 access the translation server network 8 through the global computer network (Internet) 6. As will be described further in following paragraphs, documents submitted by customers 2 to the translation server network 8 are translated at least partially automatically by the localization engines 18 utilizing the multilingual translation database 20, by offline translators 4 and/or online translators 26, through an intranet network.

Looking at the operation of system 1000, one or more users 2, using a Web browser or like type software access the Web server 10 through the global computer network 6. The E-services Translation Portal (ETP) 10 allows users 2 to establish translation projects and store ETP and flow data in the flow database 14 for establishing a workflow for the customer's documents to be translated, also providing reports to the administrator 22 and the flow designer 24. As the number of customers increases, additional servers 16 are brought online. Customer documents to be translated are stored in the file system memory 12. The documents stored in file system storage 12 are subsequently 'processed by localization engines 18 wherein the documents are identified as to file type, i.e. HTML, GIF, anyone of a multiplicity of word processor, text, or spreadsheet file types. Next, the file is separated into translatable and non-translatable strings and stored in the translation database 20. Once the translatable strings of the file have been identified, they are then compared with previously translated strings to find similar strings which have' already been translated. If a string matches more than one previously translated string, the customer's string to be translated at this time will be matched with the prior translation which has the highest frequency of use, or from the latest or user specified single or multiple previous translation versions. The partially translated document is also stored in the translation database 20.

The translation of the partially translated document is then completed by an online translator 26, or an offline translator 4, in accordance with the workflow design established for the particular customer 2. The workflow design may specify a particular translator 4, 26 that the customer 2 has engaged. The vendor (translator) assigns a price per unit for its work. This unit can be based on the number of words to be translated, a number of hours, etc. The customer selects a vendor based on a number of criteria including, but not limited to, resumes, references, customer ratings, volume, location, expertise and the like, which information is transferred to the customer 2 by the server 10.

Customers submit projects through the Internet to the translation server network, where the Web server/ETP 10 and database 14 are utilized to provide a measurement of the project. The size of the project is automatically estimated and broken down by some number of units. Then, based on the number of units and the vendor's cost per unit, a quote is provided to the customer through the server 10, which can also include a schedule and incremental costs. Alternately, the project may be entered for bid, where the customer submits its project to a selected list of vendors from which quotes are received.

After the customer receives and approves a quote, the customer transmits a contract to the vendor to perform the work. The selected vendor then executes the contract electronically to accept the project. The fact that the vendor receives the project from the translation server network 8, partially translated, reduces the costs of translation services. The customer, using their connection to the translation server network 8 through the Internet, can track the progress of the project, conduct interim reviews, provide interim approvals and, through the use of log files, has access to an audit trail.

Figure 2:
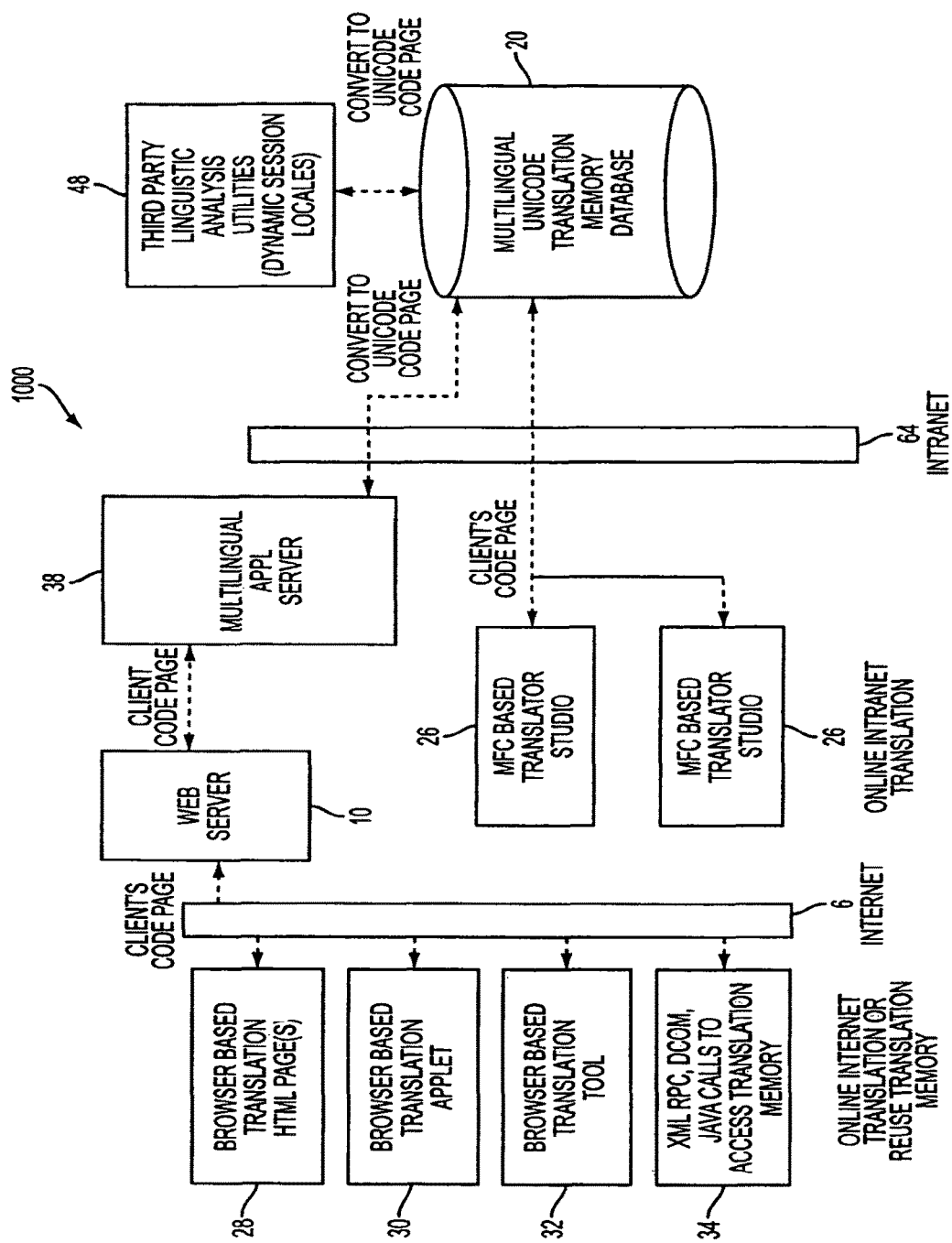
FIG. 2 is a block diagram illustrating the present invention.

Turning now to FIG. 2, such shows system 1000 from another perspective. Access to Web server/ETP 10 through the network 6 is accomplished by customers utilizing browsers for submitting translation jobs as part of HTML pages 28. Vendors access the documents to be translated through browser-based tools 30, 32 and 34. Web server/ETP 10 communicates with the multilingual application server 38, the Web server/ETP 10 receiving the files and transmitting the files to the customer, while the application server 38 creates the projects, creates orders, checks for the translatable strings and stores them in the translation database 20. The application server 38 embodies servers 16, database 14, localization engines 18, and the file system 12 of FIG. 1. The functions of servers 10 and 38 can be implemented on a single computer or a network of computers. Multilingual application server 38 communicates with the multilingual translation memory database 20 through the intranet 64, the network that is internal to the translation server network 8, shown in FIG. 1. The translatable strings that are stored in translation database 20 may also be processed by third party linguistic analysis utilities 48 which may access the database. The translation memory database 20 is also accessible by the online translators 26 through intranet 64.

Figure 3:
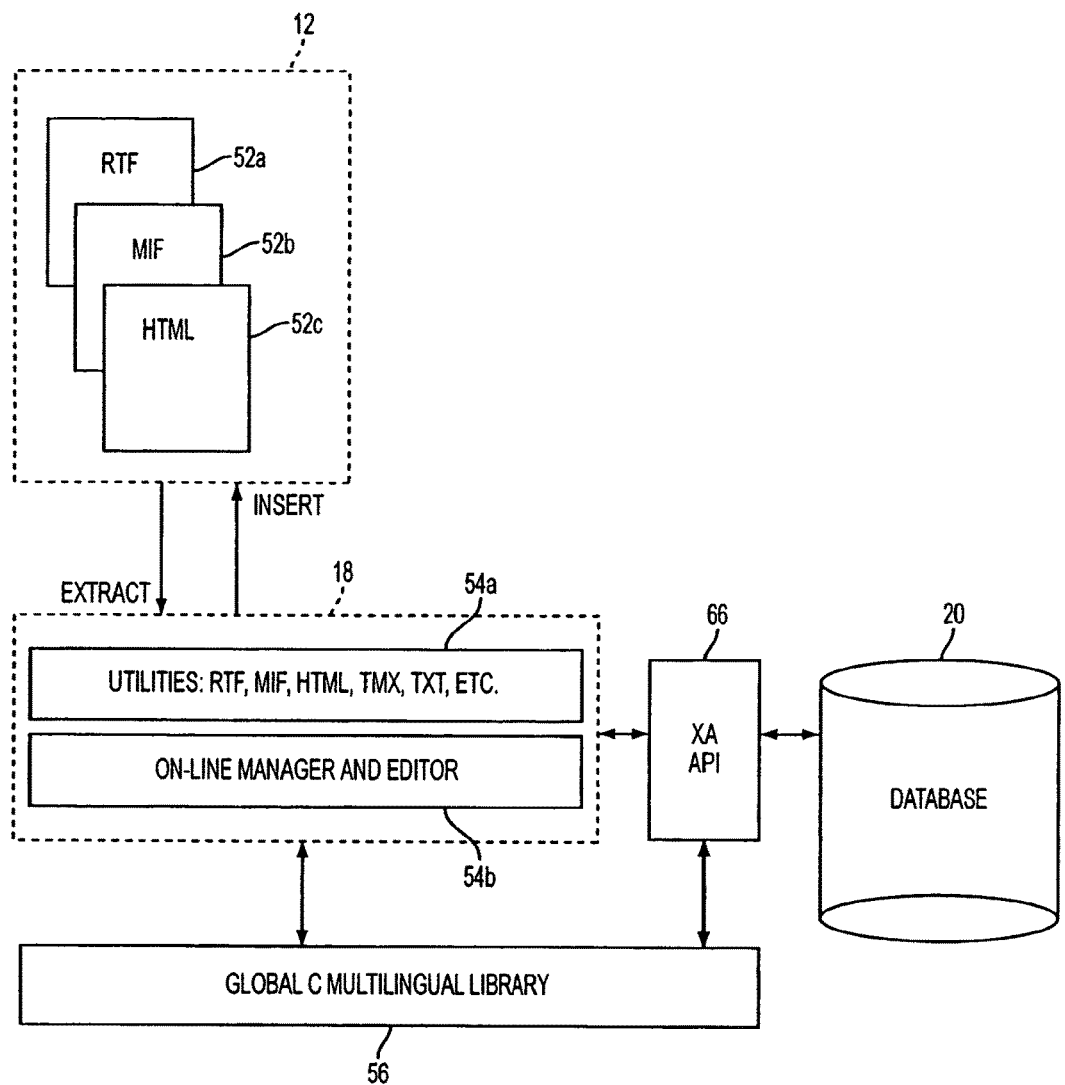
FIG. 3 is a block diagram illustrating the translation and management architecture of the present invention.

Turning to FIG. 3, such shows the software architecture for accomplishing the translation of input documents. The files stored in the file system storage 12 may be in any of a plurality of different text documents or graphics formats 52a, 52b, and 52c. The localization engines 18 utilize utilities 54a to interpret those differently formatted documents, and utilize on-line manager and editor routines 54b for processing those documents. The processing of those documents is done in cooperation with an open system multilingual library 56 and the localization engines 18 communicate with the translation database 20 through an application program interface (API) 66 utilizing an open protocol.

Figure 4:
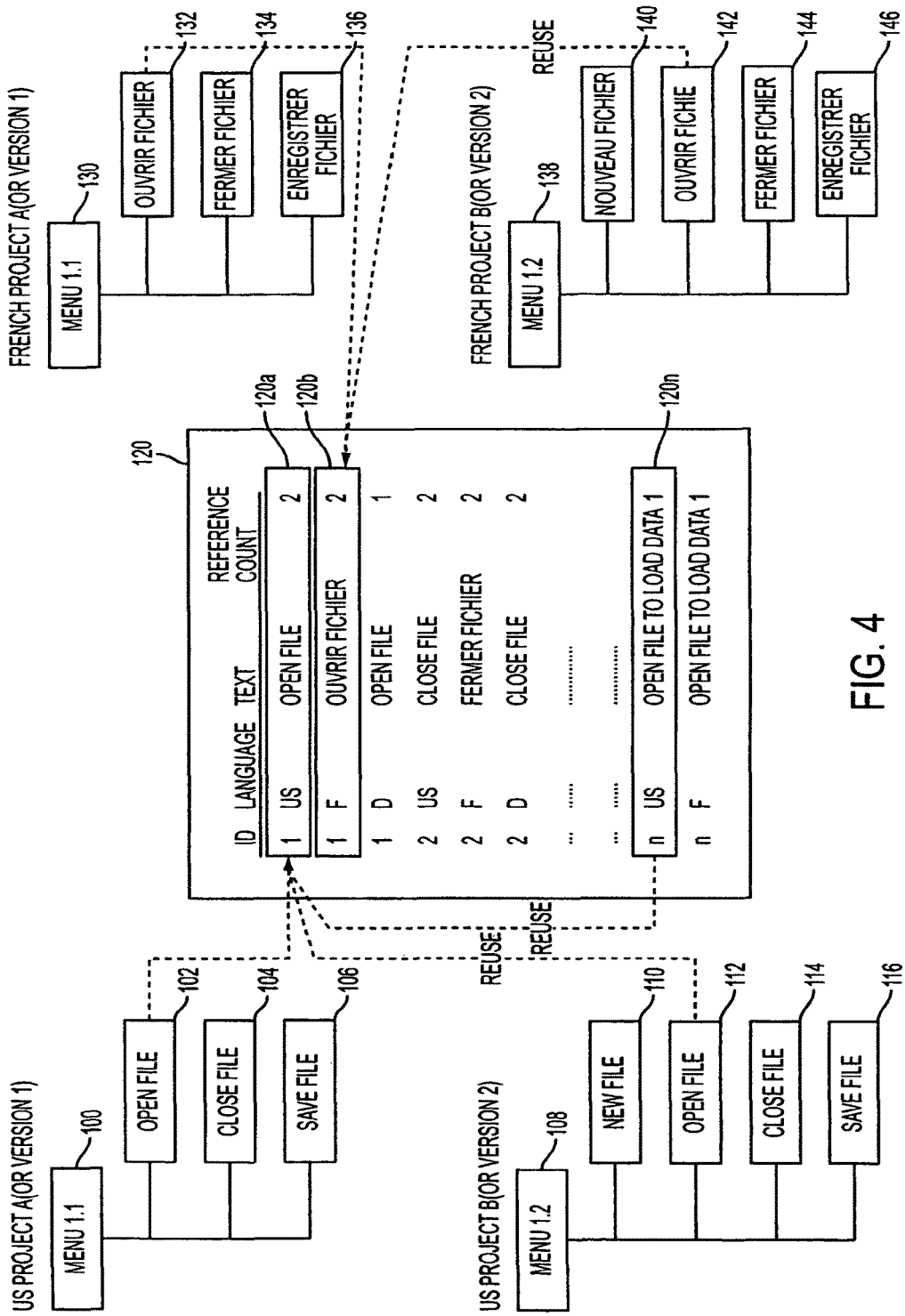
FIG. 4 is an illustration of the translation memory architecture of the present invention.

Referring to FIG. 4, such illustrates the translation memory architecture. Translation database 20 stores multiple projects 100, 108 which each include respective strings 102, 104, 106 and 110, 112, 114, 116 to be translated. In the illustration, menus for use in a computer program are illustrated. The translated projects 130 and 138 are also stored in memory with the respective translated (French) strings 132, 134, 136 and 140, 142, 144, 146. A database text table 120 is provided which includes pointers for finding the text in the translation database 20. Each entry 120a-120n in the table 120 includes an ID which refers to the particular project, the language of the text, the text itself and a reference count, which indicates the number of different projects utilizing that same text. Thus, the text "open file" of strings 102 and 112 is referred to as a single entry 120a in the table 120. Similarly, the translated French text "ouvrir fichier" of strings 132 and 142 are similarly referred to in the single database entry 120b.

Where text incorporates a translated term in some other project n, such is considered a subset of the preceding entry. Thus, the text "open file" is considered a subset of the text "open file to load data" and thus the entry 120n will include a reference pointing to the Table entry 120a. By that arrangement, a portion of the string "open file to load data" can be obtained from the previously translated string "open file". Thus, the translation process is simplified and the database overhead is reduced. By maintenance of the translation database 20, the automated translation system becomes more robust the more it is used, as every string which has been previously translated need not be duplicated by human translators. The translation database 20 can therefore be shared by multiple customers and vendors through the Internet. Localization engines 18 search the database for past translations. Translations which match, or just partially match are identified and added to the file that is provided to the translation vendor 4, 26.

The advantages provided by the system can be clearly seen when one considers a class of customers who would utilize the system. For instance, Web site owners who wish to duplicate their Web sites in multiple languages are customers who would benefit from system 1000. The text found in most Web sites is between 50% and 60% redundant. Therefore, at least 50% to 60% of the time and money required for translation would be saved, as the redundant text strings found in a given HTML file of a web site would be translated automatically, and not require the services of the vendor translator. Thus, over time, users of system 1000 would increasingly benefit by its expanded knowledge database.

Figure 5:
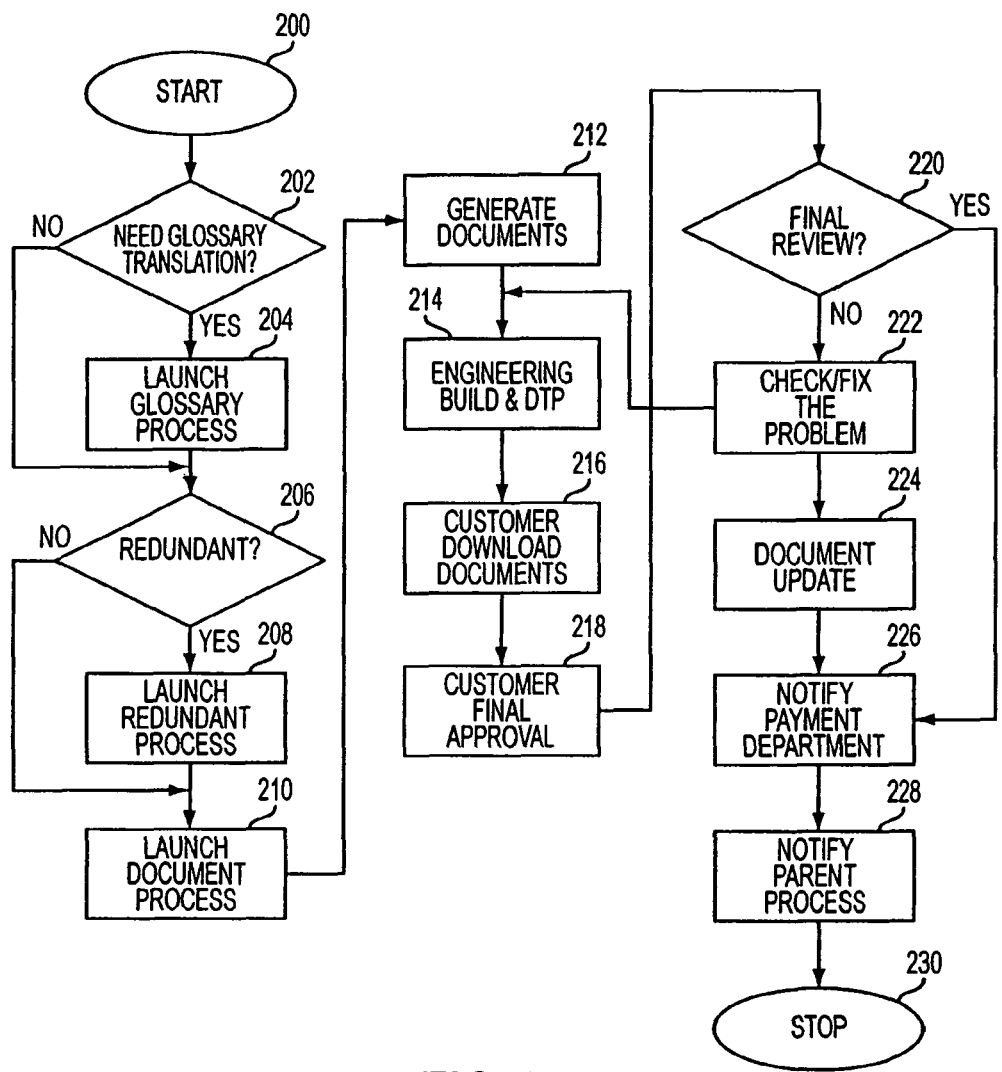
FIG. 5 is a flow chart representing the translation process of the present invention.

An example of a translation process workflow which would be established by the flow designer 24 is shown in FIG. 5. The process starts at 200 and next goes to the, decision block 202, wherein it is determined whether a glossary is needed. A glossary is a collection of long phrases found in a document. In some cases, the customer may already have a glossary that is uploaded; in other cases it must be created. Glossaries are particularly useful where there are many translators working on a project. One translator translates the glossary and then after review and approval by the client, or a reviewer contracted by the client, it can be distributed to all the translators. The use of glossaries ensures that common terms are translated consistently across all files of a customer's single project or multiple projects. The instant invention provides for creation of both default and custom glossaries. When a default glossary is created, the strings are extracted automatically, and are therefore project specific. Custom glossaries can be created to standardize terminology across projects, corporate divisions, or entire corporations. The user can create as many glossaries as desired. The glossaries are not used to automatically translate a project, but are given to all translators working on a client's project or projects, to give all the translators the same verbiage for use within their respective translations. The use of the common verbiage of the glossary keeps the consistency at a high level.

If a glossary is needed, the flow passes to block 204 where the glossary generation process is initiated. From block 204, the flow passes to decision block 206 to determine whether there is redundant data. If there is redundant data, the flow passes to block 208 wherein redundant processing is initiated. Thus, the reference count for the text strings are scanned and only one string of a redundant group need be translated. From block 208, the actual document translation process is initiated in block 210 and the translated document is generated in block 212. From block 212, the flow passes to block 214, wherein alterations to the text document are made, such as changes to the font size and format of the document. From block 214, the flow passes to block 216, wherein the customer inspects the document. From there, the flow passes to block 218, wherein the customer's final approval is received. From block 218, the flow passes to decision block 220 where it is determined whether the document has been finally reviewed. If it has, then the flow passes to block 226 wherein the customer is billed. If the final review has not been completed, then the flow passes to block 222 wherein the document is checked, and if problems are found, the flow passes back to block 214 to cycle through the loop again. If there are no problems, or such have been fixed, the flow passes from block 222 to block 224 wherein the document is updated, as required. From block 224, the flow passes to block 226, wherein the customer is billed. From block 226, the flow passes to block 228, to indicate to the parent process, such as the order process shown in FIG. 6 that workflow is complete. The process then ends at stop block 230.

Figure 6:
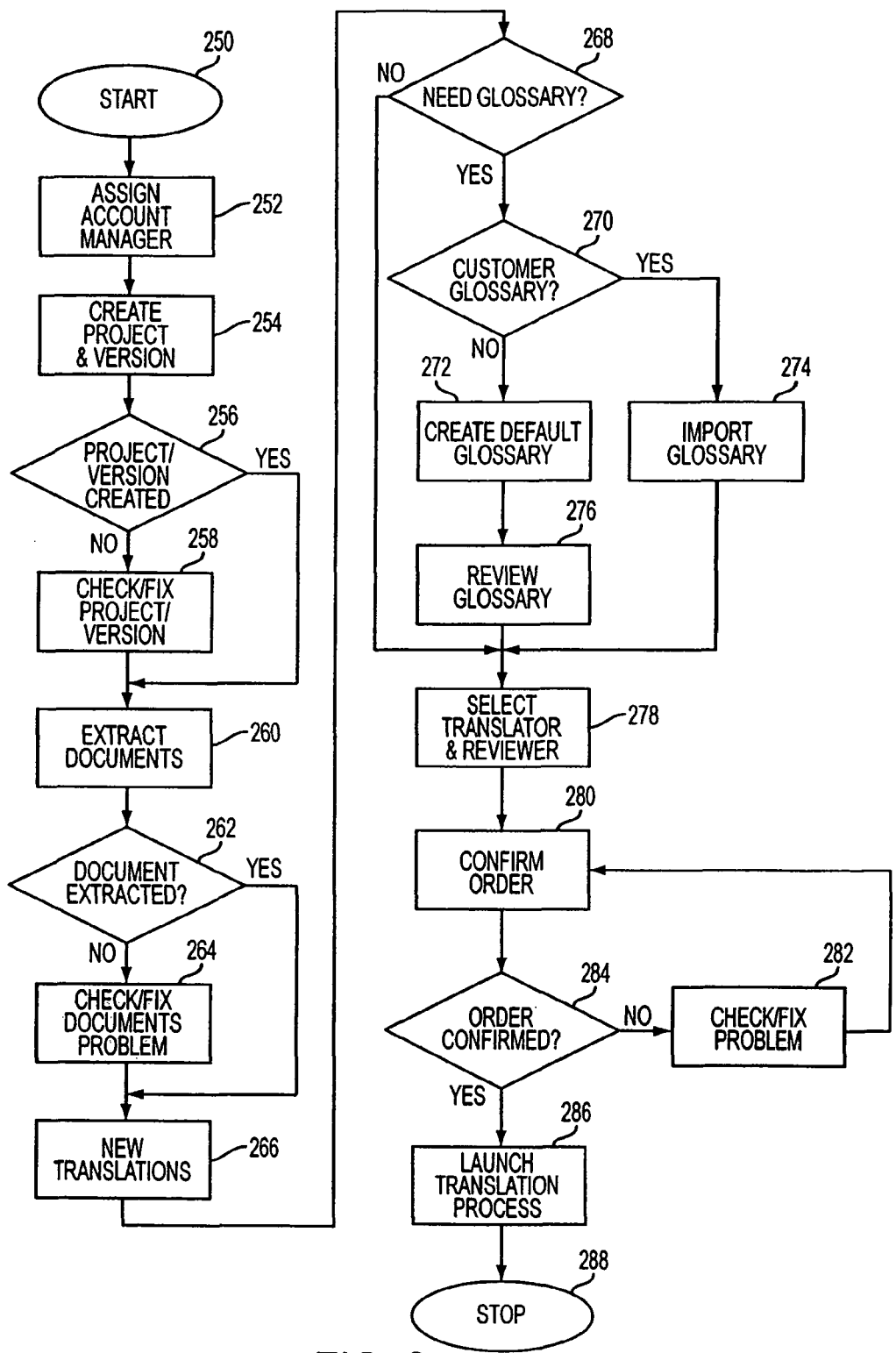
FIG. 6 is a flow chart illustrating the order process of the present invention.

In FIG. 6, the order process is shown. Starting from the start block 250, the flow passes to block 252. In block 252, an account manager is assigned to the project that will be created in block 254. In block 254, the project and version (which language) is created by the customer and can include creation of the workflow design (FIG. 5). From block 254, the flow goes to decision block 256, wherein it is determined whether the project and version are created properly. If they are, the flow passes to block 260, otherwise, the flow passes to block 258, wherein the assigned account manager checks and fixes the project and/or version. From block 258, the flow passes to block 260. In block 260, the application programming interface 66 and the appropriate utility 54A based on the file format of the document are called to extract the translatable strings. From block 260, the flow passes to decision block 262, wherein it is determined whether the strings have been completely extracted from the document. If the strings have been completely extracted, the flow passes to block 266. If they have not, flow passes to block 264, wherein the account manager checks the document and fixes any problems therewith that are preventing the complete extraction of the translatable strings. From block 264, the flow passes to block 266, wherein it is determined how many target languages are to be provided for the client, so the proper number of copies of the original file can be made. From block 266, the flow passes to decision block 268 wherein it is determined whether there is a need for a glossary. If a glossary is not required, flow passes to block 278. If, on the other hand, a glossary is required, the flow passes to decision block 270 wherein it is determined whether the customer has provided a glossary. If the customer has provided a glossary, the flow passes to block 274 where the glossary is imported and then flow passes to block 278. However, if no glossary is provided, the flow passes to block 272 wherein a glossary is created. Subsequent to creation of the glossary, the flow passes to block 276 wherein the glossary is reviewed by the client. From block 276, the flow passes to block 278 wherein the client selects the translator and reviewer (usually two different persons) for each target file. Subsequent to selection of the vendors in block 278, the flow passes to block 280, wherein the customer confirms the order. From block 280, the flow passes to decision block 284, wherein it is determined whether the order has been confirmed. If it has not, the flow passes to block 282 wherein the account manager fixes the problem in obtaining an order confirmation. In some cases, a client may have desired translation of their project into a particular number of target languages, for instance ten, but the final cost for that quantity of translations may result in a quoted cost which exceeds the client's budget. Therefore, the client may then have to scale back the extent of their order or find new vendors offering lower costs. Once the problems are fixed in block 282, the flow passes back to block 280, to repeat the cycle in obtaining order confirmation. After the order has been confirmed, the flow passes from block 284 to block 286 wherein the translation process is initiated. The translation process is the flow diagram of FIG. 5, thus the process of FIG. 6 is the parent process of that disclosed in FIG. 5. Therefore, the notification provided in block 228 of FIG. 5, is provided in block 286 of FIG. 6. From block 286, the process ends at block 288.

Figure 7:
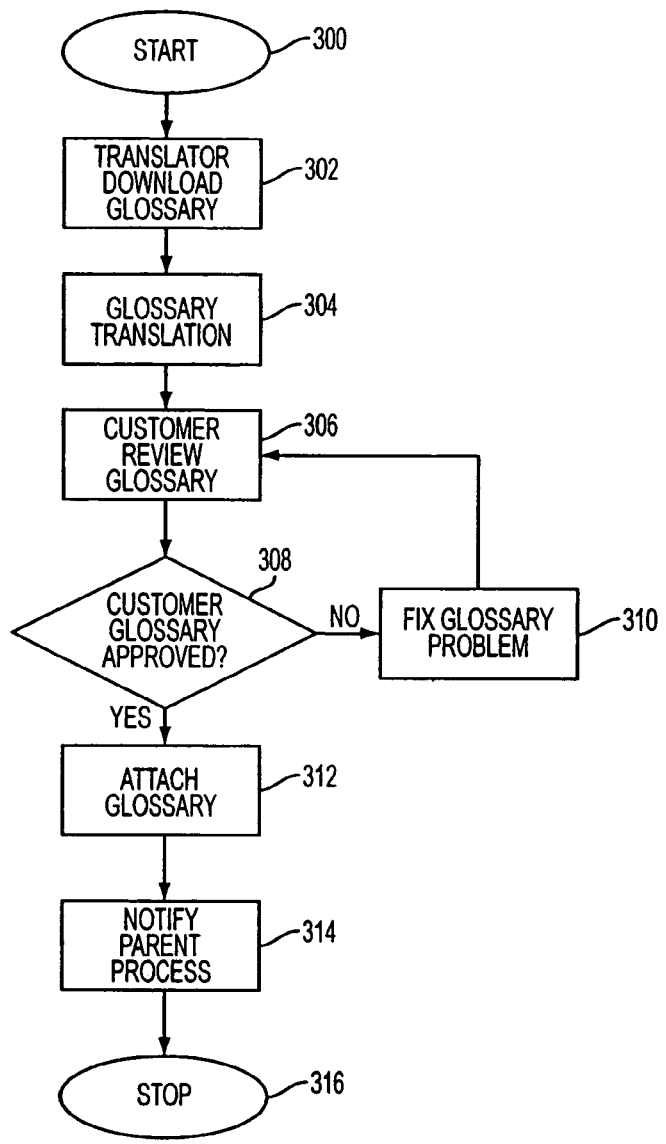
FIG. 7 is a flow diagram illustrating the glossary translation process of the present invention.

FIG. 7 is a flow diagram of the glossary translation process which is initiated in block 204 of FIG. 5. From the start block 300, the flow passes to block 302, wherein a translator 4 downloads the glossary from the Web server 10. The selected vendor 4 is sent an E-mail message informing them that the glossary is ready to be downloaded and provides a hyperlink to the Web page identifying the site from which the glossary may be downloaded via Web based file transfer mechanisms including but not limited to File Transfer Protocol (FTP). From block 302, the flow passes to block 304, wherein the vendor provides the translation of the glossary into the desired target language or languages. From block 304, the flow passes to block 306, wherein the translated glossary is provided to the customer for the customer's review. To insure that the customer agrees with the translation, a loop is provided which begins with decision block 308 where it is determined whether or not the customer has approved the translated glossary. If the customer has not approved it, flow passes to block 310, wherein the vendor fixes the problems identified by the customer. From block 310, the flow passes back to block 306, to permit the customer to review the corrections made by the vendor. Once the customer has approved the glossary, the flow passes to block 312 wherein the translated glossary is attached (identified with) the document to be translated. From block 312, the flow passes to block 314, wherein the parent process, shown in FIG. 5, is notified that the glossary translation process has been completed. From block 314, the process terminates at block 316.

Figure 8:
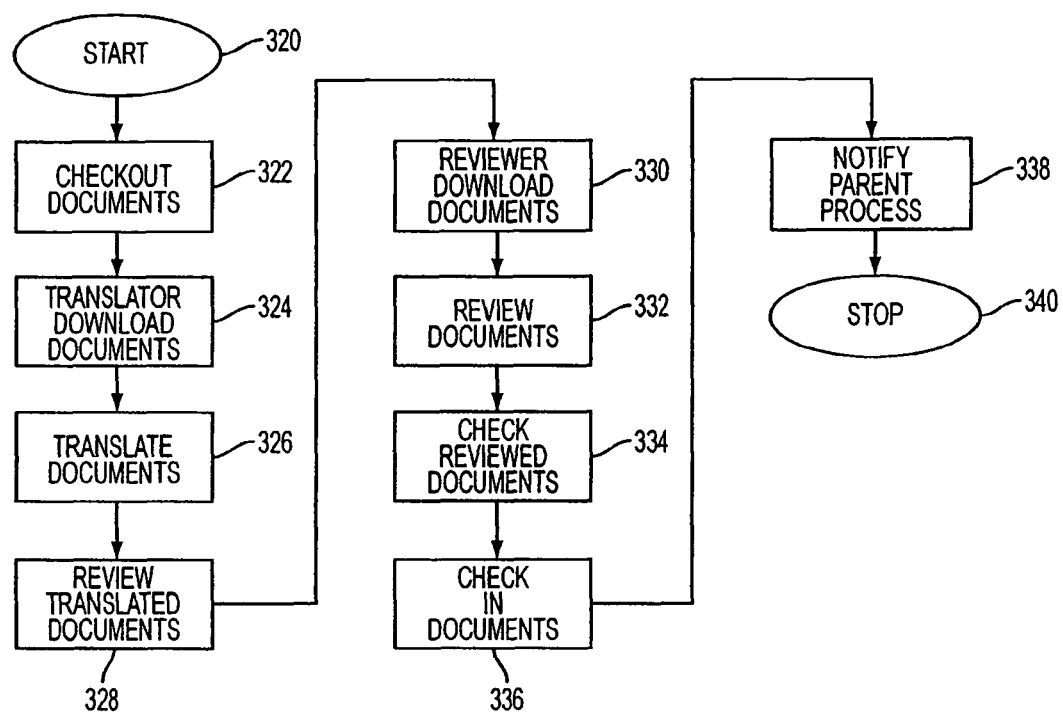
FIG. 8 is a flow chart illustrating the document translation process of the present invention.

Block 210 of FIG. 5 initiates the document translation process. The flow chart for that process is illustrated in FIG. 8. From start block 320 in FIG. 8, the flow passes to block 322 wherein the vendor is sent an E-mail message describing the Web site location of the documents to be translated, so that the vendor can inspect the documents. Flow then passes to block 324, wherein the translator downloads the documents for offline translation. The flow then passes to block 326, wherein the translator performs the translation of the documents. Subsequently, upon completion of the translation, flow passes to block 328, wherein the translated documents are forwarded (uploaded) for review. The reviewer is sent an E-mail indicating that the translation is ready for review. Flow then passes to block 330 wherein the reviewer downloads the translated documents. Subsequent to downloading the documents, the flow passes to block 332 wherein the reviewer performs a review of all of the translated documents and makes any corrections necessary. From block 332, the flow passes to block 334, wherein the reviewed documents, and especially corrections, are checked. Such secondary review may be carried out by a second reviewer. From block 334, the flow then passes to block 336 wherein the reviewed translated documents are uploaded to the Web server 10. The flow then passes to block 338, wherein the parent process, block 210 of FIG. 5, is notified that the translation process is complete. The process then ends at stop block 340.

Figure 9:
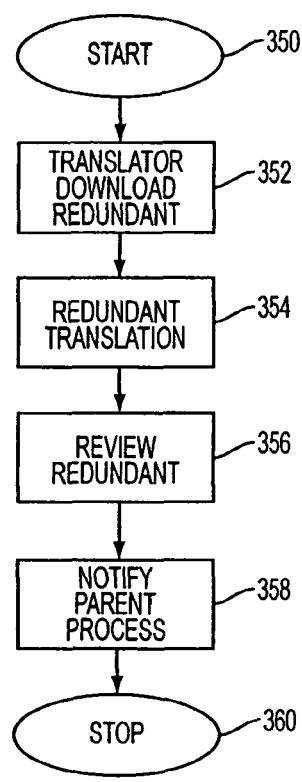
FIG. 9 is a flow chart illustrating the redundant translation process of the present invention.

Turning now to FIG. 9, such shows the redundant string translation process which is initiated by block 208 of FIG. 5. From the start block 350, flow passes to block 352 wherein the redundant strings are downloaded by the translator. From block 352, the flow passes to block 354, wherein the translator translates the strings which have been identified as having multiple re-occurrences in the document. From block 354, the block passes to block 356, wherein a reviewer, usually a separate individual, reviews the translated strings. From block 356, flow passes to block 358, wherein the parent process is notified that the redundant string processing has been completed, such notification being provided in block 208 of FIG. 5. From block 358, the process terminates at block 360.

Figure 10:
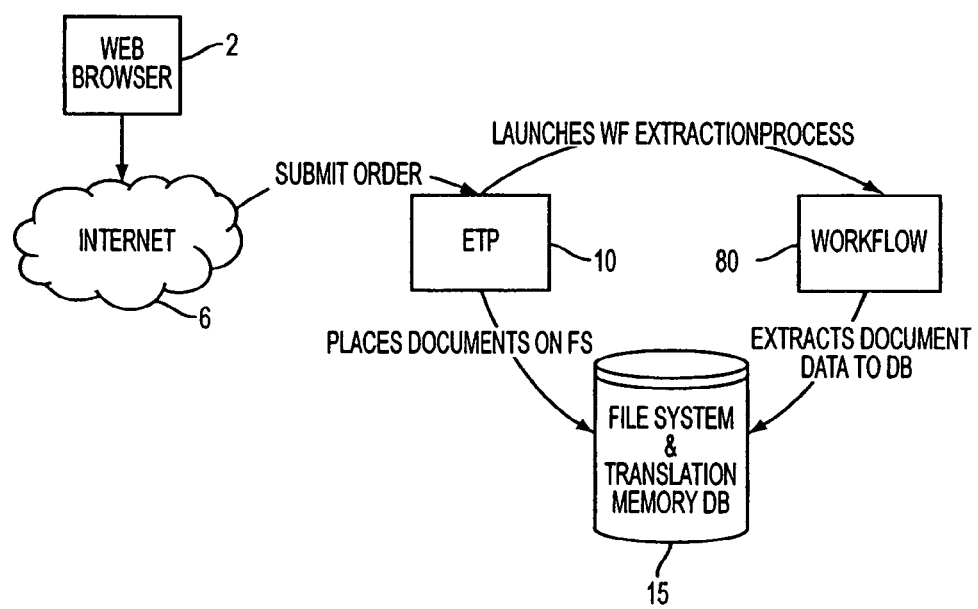
FIG. 10 is an illustration of the order of submission process of the present invention.

Referring now to FIG. 10, such shows the order submission process from another perspective. The customer 2 utilizing a Web browser submits an order to the Eservices translation portal embodied in the Web server 10 through the Internet 6. The server 10 stores the documents in a file system disposed within the memory 15. Memory 15 includes file system 12 and translation database 20 shown in FIG. 1. Server 10 also launches the workflow extraction process to extract the translatable strings which are stored in the translation memory database of memory 15, which is carried out by the workflow process 80. The workflow process 80 also includes the reuse of prior translations, where a search is made between the translatable strings of a current project and strings which have previously been processed, to provide a translation when a match is found.

Figure 11:
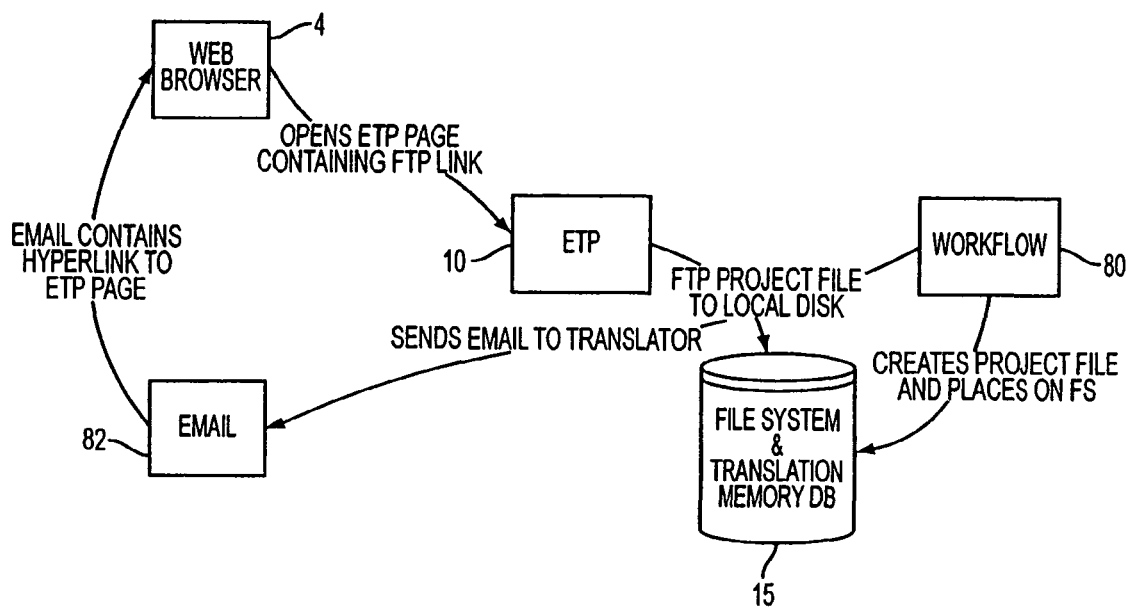
FIG. 11 is an illustration of the translation order assignment process of the present invention.

In FIG. 11, the translation order assignment flow is shown. The workflow process 80 creates a project file and stores that in the file system of memory 15. The workflow process 80 then sends an E-mail 82 to the translator 4. The E-mail contains information about the order, the download location, a hyperlink to the ETP page having a link to the Internet site for downloading the file(s) via Web based file transfer mechanisms including but not limited to File Transfer Protocol (FTP). The translator 4 utilizing the Web browser browses the ETP Web page containing the Web download link to the project file (e.g. via FTP) by utilizing the hyperlink contained in the E-mail 82. Using the browser, the translator 4 downloads the project file from the Web download site and then invokes the local translation software and proceeds to then perform the translation task.

Figure 12:
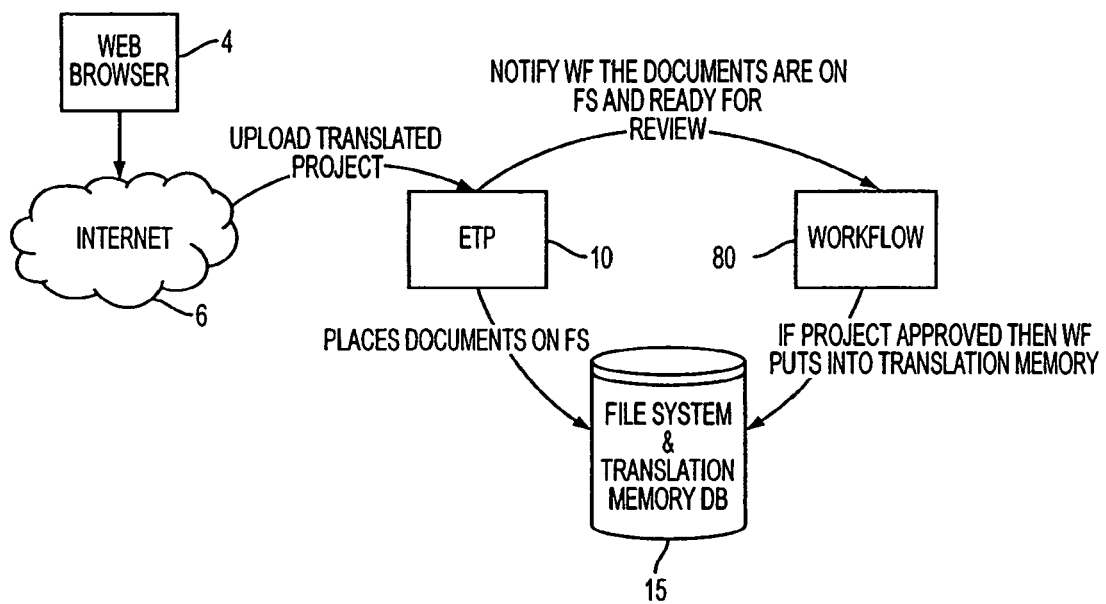
FIG. 12 is an illustration of the order completion flow of the present invention.

Upon completion of the translation task, the translator then uploads the translated document, which process is illustrated in FIG. 12. The translator 4 utilizing a Web browser uploads the translated project through the Internet 6 to the ETP server 10. The server 10 saves the project to the file system in memory 15 and notifies the workflow process 80 that the files are ready. The workflow process 80 handles the flow from reviewers to accept or reject the translation. If the reviewer accepts the project files then the workflow process 80 will store the translated document in the translation memory database, within memory 15. Finally, the translated files are provided to the customer. In order to complete that process, the workflow process 80 sends an E-mail to the customer which contains information about the order, the download location for the translated documents and a hyperlink to the ETP page with a Web download link to the project file (translated documents) via Web based file transfer mechanisms including but not limited to File Transfer Protocol (FTP). A customer, utilizing their browser, employs the hyperlink to access the Web download link to the project, and then utilizing that link, downloads the translated file.

Figure 13:
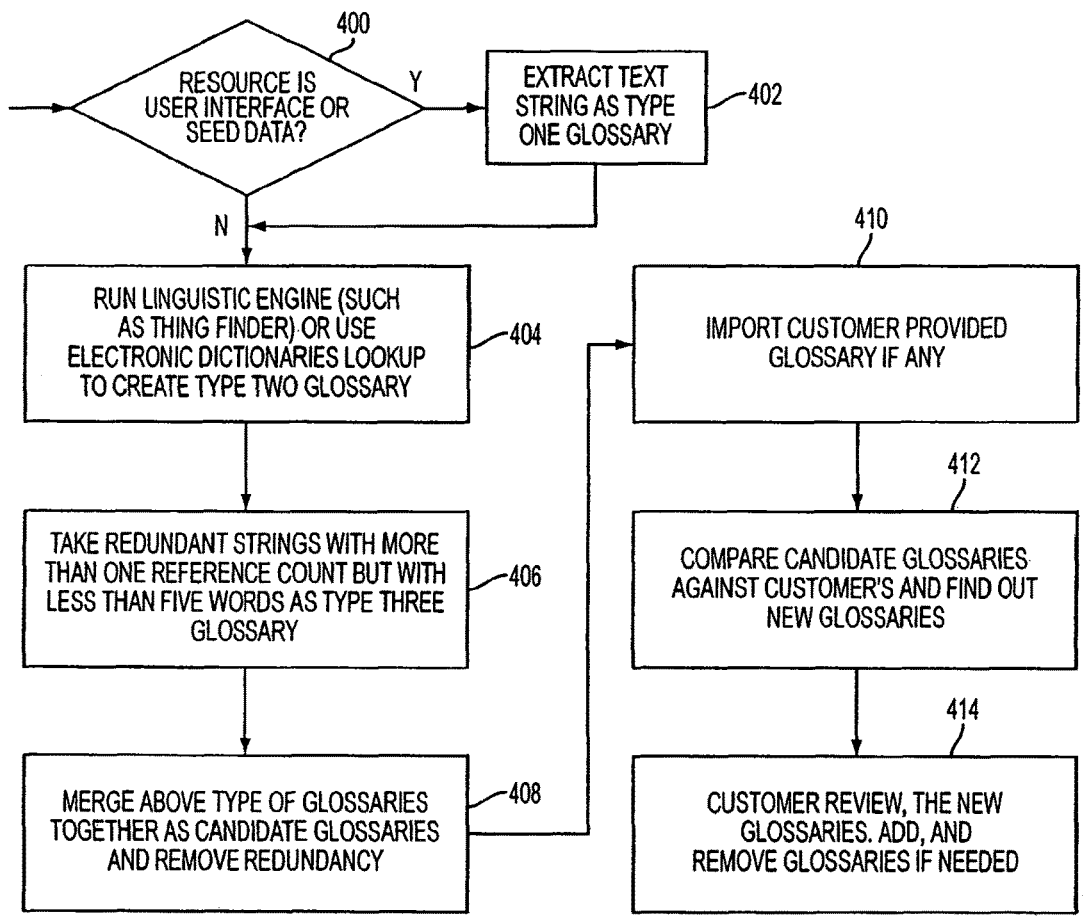
FIG. 13 is a flow chart illustrating the glossary creation process.

The process for creating a default glossary, block 272 of FIG. 6, is shown in FIG. 13. In FIG. 13, the flow starts with a decision block 400 wherein it is determined whether a user interface and thus texts included in the user interface exists or whether there is seed data. Seed data is a list of terms which come with initial software installation or are related to and are usually peculiar to a particular industry. If there is text embedded in a user interface - or seed data, the flow passes to block 402 wherein text strings are extracted from that data or user interface to create what is termed a type 1 glossary. If no user interface or seed data is provided, or subsequent to creating the type 1 glossary in block 402, the flow passes to block 404 wherein a linguistic engine, such as use of an electronic dictionary is used to try and match up long phrases and create a type 2 glossary. From block 404, the flow passes to block 406, wherein redundant strings, strings with more than one reference count and having less than five words are further identified as a type 3 glossary. From block 406, the flow passes to block 408, wherein the three types of glossaries are merged together and redundancies removed. From block 408, the block passes to block 410 where a customer glossary, if provided, is imported into the system.

Flow then passes to block 412, wherein the merged glossary is compared against the customer's glossary to find any conflicts. If conflicts are found, the flow passes to block 414, wherein the customer is requested to review the conflicts and make additions or corrections to the generated glossary. Flow, of course, would then pass back to the parent process.

Figure 14:
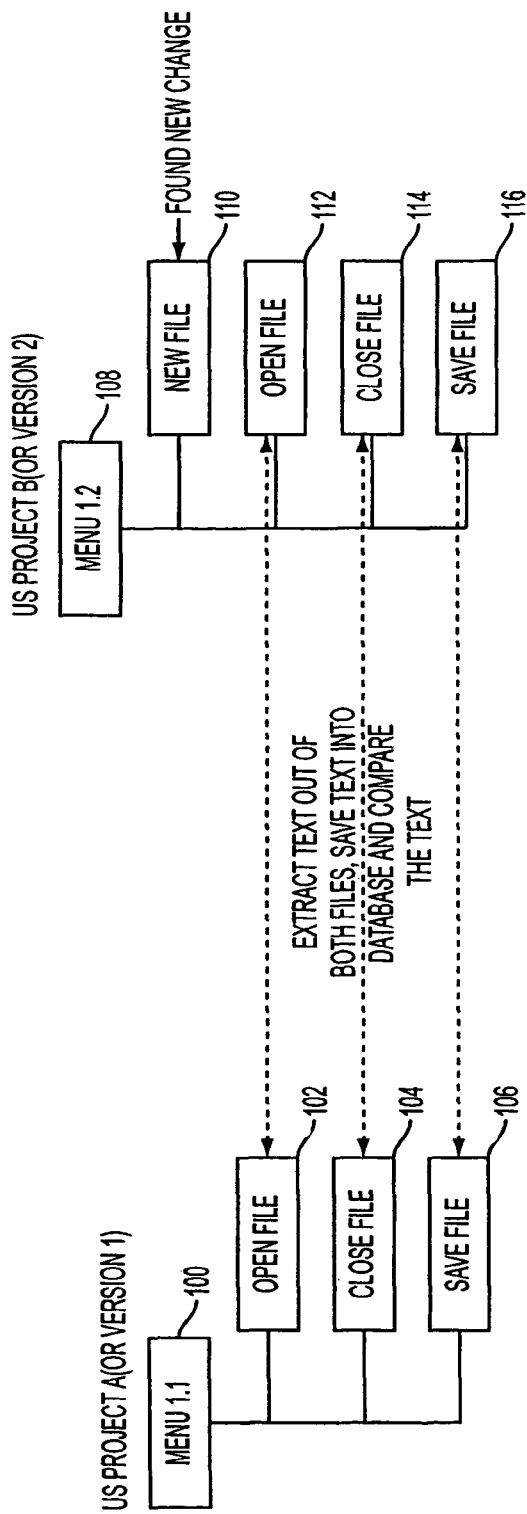
FIG. 14 is an illustration of the text comparison process of the present invention.

As previously discussed, the translation database of the present invention provides great efficiencies in reducing the translation workload required of vendors. As an example, FIG. 14 is provided to illustrate the comparison which is carried out utilizing the translation database. Thus, when a new project 108, having translatable strings 110, 112, 114 and 116, to be translated is entered into the system, it is compared with prior projects that have been provided. The match need not be exact, so that another project having the same or similar strings may be found. The comparison may then identify a prior project 100 having strings 102, 104 and 106 as being identified as being a close match. The difference between the project 100 and the new project 108 is a single string 110, thus the translation that was utilized for project 100 may be utilized again for project 108, with only the string 110 remaining to be translated. By that process, the translation workload, which must be contracted out, is minimized. In addition to the project level matching, system 1000 performs the translatable string level searching to further reduce the manual translation workload.

Figure 15:
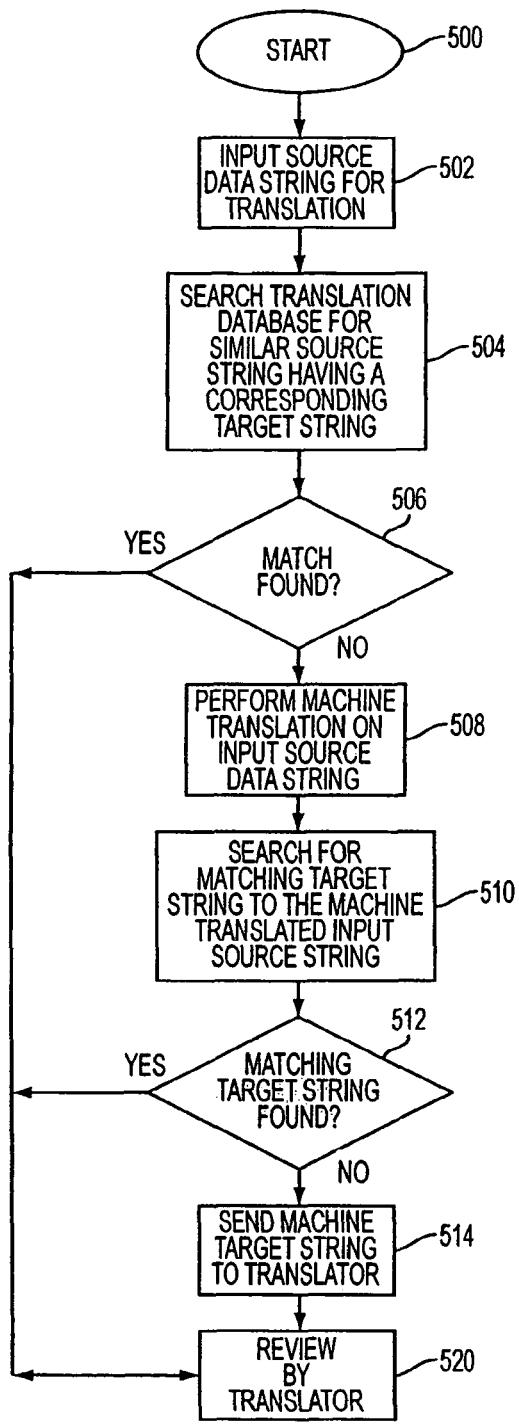
FIG. 15 is a flow chart illustrating the method of the combined machine translation and translation memory according to another embodiment of the present invention.

In the foregoing embodiments, the translator 4 plays a major role. As shown in FIG. 14, the foregoing embodiment improves the translation process by utilizing pairs of data strings and prior translations. Once the translation is constructed, the translator 4 has the task of reviewing the translation. When there is no corresponding target string for a source string, it is the translator's task to provide a translation of the source string. The embodiment shown in FIG. 15 illustrates a method that does not rely as heavily on the development of pairs of sentences in both source and target languages in the translation memory database 20 shown in FIGS. 2 and 3 and database in memory 15 shown in FIGS. 11 and 12. The embodiment shown in FIG. 15 illustrates the functioning of a translation system that minimizes the reliance on human translator 4 to correct a translation generated by machine translation (MT).

As discussed previously with regard to FIG. 5, the actual document translation process is initiated in block 210 and the translated document is generated in block 212. FIG. 15 illustrates an embodiment of this translation process. The translation process starts at block 500. A source data string for translation is input in block 502. The system then searches the translation memory for a similar source string having a corresponding translated target string in block 504. In block 506, if a match is found the target string is output for subsequent review by the translator 4 in block 520. If no match for the source string is found in decision block 504, the source string is sent to the machine translation in block 508.

In block 508, the machine translation produces a target string. This target string is produced by utilizing phrases that have already been translated in different sentences stored in the translation memory. The target string that is produced in this manner may contain the correct terms and phrases, but will likely be ill-formed. Instead of sending this target string to the translator 4 for correction, the system searches for a matching target string in the translation memory in block 510. This search performed in block 508 can be performed for all available target sentences, even if the sentences are not paired up with corresponding source language.

In performing the machine translation in block 508, example based machine translation may be used. Such example based machine translation is a more language independent approach than machine translation. Example based machine translation can work with units of data smaller than the sentences utilized in machine translation. Further, example based machine translation uses a bilingual corpus to align not only sentences, but also phrases or even words from source language to target language. If a target sentence corresponding to a source sentence is not found, a target sentence might be built from phrases that have been already translated in different sentences stored in the translation memory. However, while a well defined domain example based machine translation can retrieve correct terms and phrases, it has a trouble generating well formed sentences.

In decision block 512, if a target sentence is found that is a good match, the target sentence is sent for review by the translator 4 in block 520, since this sentence will most likely be a well formed, human created sentence. On the other hand, if a good match is not found in block 512, then the machine translation developed in block 508 is presented in block 514 for review by the translator 4 in block 520.

By the process illustrated in FIG. 15, the work of the human translator is reduced due to the fact the more well-formed sentences are output as opposed to machine translated sentences which have a higher likelihood of requiring editing. The system yields a fairly readable automatic translation without human translators. This is due in large part to the fact that sentences that have a match in block 506 are very likely to be well-formed human sentences, and instead of initially outputting the machine translation immediately from block 508, that sentence is compared to other target sentences in memory to try to locate a matching sentence, which in all likelihood will be a better-formed sentence than the machine derived one.

The method set forth in FIG. 15 can be implemented in the system shown in FIGS. 1-3, 10 and 12. Further, the method illustrated in FIG. 15 can be incorporated in the translation process shown in FIG. 5.

While illustrative systems and methods as described herein embodying various aspects of the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. In addition, aspects of the invention have been pointed out in the appended claims; however these claims are illustrative in that the invention is intended to include the elements and steps described herein in any combination or sub combination. It will also be appreciated and understood that modifications may be made without departing from the true spirit and scope of the invention.

What is claimed is:

1. A method for translating data from a source language to a target language, comprising:
   inputting source data for translation;
   searching a database for a source string similar to the inputted source data, said source string having a corresponding translated target string;
   machine translating said inputted source data if said source string similar to said inputted source data is not found, said machine translating producing a target string;
   searching said database for a human generated target string matching the target string produced by said machine translating, the searching being performed by comparing the target string produced by said machine translating and the matching human generated target string, wherein said database comprises at least one human generated target string that is not paired with a corresponding source string; and
   outputting the matching human generated target string if said matching human generated target string is found.

2. A method for translating data from a source language to a target language, comprising:
   searching a database for a source string similar to inputted source data;
   machine translating said inputted source data if the source string similar to said inputted source data is not found in the database, said machine translating producing a target string;
   searching said database for a matching human generated target string that matches the target string produced by said machine translating, the searching being performed by comparing the target string produced by said machine translating and the matching human generated target string, wherein said database comprises at least one human generated target string that is not paired with a corresponding source string; and outputting the matching human generated target string if said matching human generated target string is found.

3. The method of claim 1, wherein the database comprises strings of source data and matching strings of target data.

4. The method of claim 1, wherein the machine translating comprises using units of data smaller than a sentence.

5. The method of claim 1, wherein the machine translating comprises using a bilingual corpus to align phrases and words between the source language and the target language.

6. The method of claim 1, wherein the database comprises strings of source data and non-matching strings of target data.

7. The method of claim 1, wherein the database comprises a collection of source language sentences and target language sentences, where none of the source language sentences and target language sentences are paired together.

\* \* \* \* \*